United States Patent
Lee et al.

(10) Patent No.: US 12,445,895 B2
(45) Date of Patent: Oct. 14, 2025

(54) DEVICE AND METHOD FOR SUPPORTING QUALITY OF SERVICE IN WIRELESS COMMUNICATION SYSTEM

(71) Applicant: Samsung Electronics Co., Ltd., Gyeonggi-do (KR)

(72) Inventors: Hoyeon Lee, Gyeonggi-do (KR); Sunghoon Kim, Gyeonggi-do (KR); Sangsoo Jeong, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 148 days.

(21) Appl. No.: 17/775,501

(22) PCT Filed: Nov. 6, 2020

(86) PCT No.: PCT/KR2020/015544
§ 371 (c)(1),
(2) Date: May 9, 2022

(87) PCT Pub. No.: WO2021/091321
PCT Pub. Date: May 14, 2021

(65) Prior Publication Data
US 2022/0386164 A1   Dec. 1, 2022

(30) Foreign Application Priority Data

Nov. 7, 2019  (KR) .................. 10-2019-0142147
Nov. 7, 2019  (KR) .................. 10-2019-0142162
Nov. 6, 2020  (KR) .................. 10-2020-0147875

(51) Int. Cl.
*H04W 28/02*  (2009.01)
*H04W 28/24*  (2009.01)
*H04W 36/30*  (2009.01)

(52) U.S. Cl.
CPC ... *H04W 28/0268* (2013.01); *H04W 28/0263* (2013.01); *H04W 28/0273* (2013.01); *H04W 28/24* (2013.01); *H04W 36/304* (2023.05)

(58) Field of Classification Search
CPC ......... H04W 28/0268; H04W 28/0263; H04W 28/0273; H04W 28/24; H04W 36/30; H04W 28/02; H04W 80/10
See application file for complete search history.

(56) References Cited

U.S. PATENT DOCUMENTS

2009/0156219 A1   6/2009   Kim et al.
2011/0090871 A1   4/2011   Kim et al.
(Continued)

FOREIGN PATENT DOCUMENTS

EP       3913963 A1    11/2021
KR   10-2020-0099956    8/2020

OTHER PUBLICATIONS

PCT/ISA/210 Search Report issued on PCT/KR2020/015544, Mar. 5, 2021, pp. 5.
(Continued)

*Primary Examiner* — Omer S Mian
(74) *Attorney, Agent, or Firm* — The Farrell Law Firm, P.C.

(57) ABSTRACT

The present disclosure relates to a 5th generation (5G) or pre-5G communication system for supporting a higher data transfer rate than 4th generation (4G) communication systems such as long term evolution (LTE). An operating method for a base station in a wireless communication method comprises a step for transmitting a first message to another base station, and a step for receiving a second message from the other base station, the first message comprising information indicating whether the base station supports at least one of an alternative quality of service (Continued)

(QoS) profile function and a QoS flow establishment queue function.

12 Claims, 12 Drawing Sheets

(56) References Cited

U.S. PATENT DOCUMENTS

| | | | | |
|---|---|---|---|---|
| 2012/0044907 A1* | 2/2012 | Mildh | ............... | H04W 36/0072 |
| | | | | 370/331 |
| 2017/0353901 A1* | 12/2017 | Aramoto | ............... | H04W 36/26 |
| 2020/0374742 A1* | 11/2020 | Chong | ................ | H04W 72/542 |
| 2022/0159575 A1* | 5/2022 | Lee | ....................... | H04W 76/28 |
| 2022/0167217 A1* | 5/2022 | Wei | ................... | H04W 28/0268 |

OTHER PUBLICATIONS

PCT/ISA/237 Written Opinion issued on PCT/KR2020/015544, Mar. 5, 2021, pp. 10.
Huawei, HiSilicon, 3GPP TSG SA WG2 Meeting #135 S2-1910008 Split, Croatia, Oct. 14-18, 2019 (Revision of S2-1909268), pp. 2.
3GPP TS 23.501 V16.2.0 (Sep. 2019) Technical Specification 3rd Generation Partnership Project; Technical Specification Group Services and System Aspects; System Architecture for the 5G System (5GS); Stage 2 (Release 16), pp. 391.
3GPP TS 23.503 V16.2.0 (Sep. 2019) Technical Specification 3rd Generation Partnership Project; Technical Specification Group Services and System Aspects; Policy and Charging Control Framework for the 5G System (5GS); Stage 2 (Release 16), pp. 104.

* cited by examiner

DEVICE AND METHOD FOR SUPPORTING QUALITY OF SERVICE IN WIRELESS COMMUNICATION SYSTEM

PRIORITY

This application is a National Phase Entry of International Application No. PCT/KR2020/015544, which was filed on Nov. 6, 2020, and claims priority to Korean Patent Applications Nos. 10-2019-0142147, 10-2019-0142162, and 10-2020-0147875, filed in the Korean Intellectual Property Office on Nov. 7, 2019, Nov. 7, 2019, and Nov. 6, 2020, respectively, the entire content of each of which is incorporated herein by reference.

TECHNICAL FIELD

The disclosure generally relates to a wireless communication system and, more particularly, to a device and method for supporting a quality of service in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to effectively provide these services.

DISCLOSURE OF INVENTION

Technical Problem

Based on the foregoing discussion, the disclosure provides a device and method capable of effectively providing a service in a wireless communication system.

The disclosure provides a device and method for monitoring and changing information on a quality of service (QoS) which can be provided to a terminal in a wireless communication system.

The disclosure provides a device and method for monitoring and changing information on a quality of service (QoS) which can be provided to a data session being used by a terminal in a wireless communication system.

Solution to Problem

According to various embodiments of the disclosure, an operation method of a base station in a wireless communication system may include transmitting a first message to another base station, and receiving a second message from the another base station. The first message may include information indicating whether the base station supports at least one of an alternative quality of service (QoS) profile function and a QoS flow establishment pending function.

According to various embodiments of the disclosure, a base station in a wireless communication may include: a communication unit; and a controller operatively connected to the communication unit; wherein the controller is configured to transmit a first message to another base station, and receive a second message from the another base station, wherein the first message includes information indicating whether the base station supports at least one of an alternative quality of service (QoS) profile function and a QoS flow establishment pending function.

According to various embodiments of the disclosure, an operation method of a device for an analytics function (AF) in a wireless communication system may include receiving a first message, and modifying a service or canceling a request for a quality of service (QoS) change, based on the first message, wherein the first message includes information indicating that an alternative session QoS change function is not supported.

According to various embodiments of the disclosure, an analytics function (AF) in a wireless communication system may include: a communication unit; and a controller operatively connected to the communication unit, wherein the controller is configured to receive a first message, and modify a service or cancel a request for a quality of service (QoS) change, based on the first message, wherein the first message includes information indicating that an alternative session QoS change function is not supported.

Advantageous Effects of Invention

A device and method according to various embodiments of the disclosure enable support of a quality of service according to the capability of a base station.

A device and method according to various embodiments of the disclosure enable effective support of a quality of service.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure, hereinafter, relates to a device and method for supporting a quality of service in a wireless communication system. Specifically, the disclosure describes a technique for performing a handover procedure according to the capability of a base station in a wireless communication system.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, in the following description of the disclosure, various embodiments will be described using terms and names employed in some communication standards (e.g., 3rd generation partnership project (3GPP)) only for the sake of illustration. However, various embodiments of the disclosure may be easily applied to other communication systems through modifications.

That is, the following detailed description of embodiments of the disclosure is mainly directed to NG-RAN and Packet Core (5G system or 5G core network) that are a radio access network and a core network specified in the 5G network standards defined by the 3GPP, but based on determinations by those skilled in the art, the main idea of the disclosure may be applied to other communication systems having similar backgrounds or channel types through some modifications without significantly departing from the scope of the disclosure.

Figure 1:
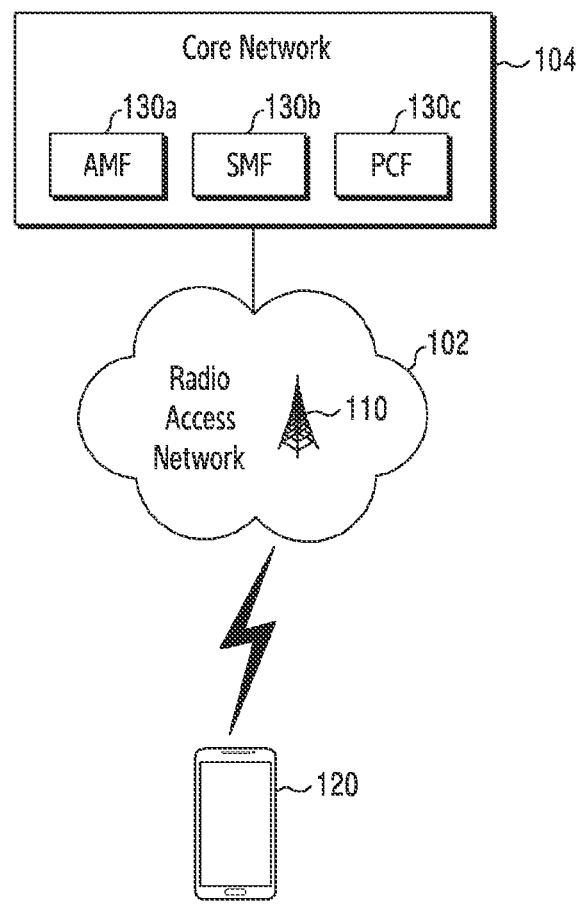
FIG. 1 illustrates a wireless communication system according to various embodiments of the disclosure.

FIG. 1 illustrates a wireless communication system according to various embodiments.

Referring to FIG. 1, a wireless communication system includes a radio access network (RAN) 102 and a core network (CN) 104.

The radio access network 102 is a network directly connected to a user device, for example, a terminal 120, and is an infrastructure that provides radio access to the terminal 120. The radio access network 102 may include a set of multiple base stations including a base station 110, and the multiple base stations may perform communication via interfaces established therebetween. At least some of the interfaces between the multiple base stations may be wired interfaces or wireless interfaces. The base station 110 may have a structure in which a central unit (CU) and a distributed unit (DU) are separated. In this case, a single CU may control multiple Dus. The base station 110 may be referred to as, in addition to a base station, an "access point (AP)", a "next generation node B (gNB)", a "5th generation (5G) node", a "wireless point", a "transmission/reception point (TRP)", or other terms having equivalent technical meanings. The terminal 120 may access the radio access network 102 and may perform communication with the base station 110 via a radio channel. The terminal 120 may be referred to as, in addition to a terminal, a "user equipment (UE)", a "mobile station", a "subscriber station", a "remote terminal", a "wireless terminal", a "user device", or other terms having equivalent technical meanings.

The core network 104 is a network that manages the entire system, which controls the radio access network 102 and processes data and control signals for the terminal 120, which are transmitted or received via the radio access network 102. The core network 104 performs various functions, such as controlling a user plane and a control plane, processing mobility, managing subscriber information, charging, and interworking with other types of systems (e.g., a long-term evolution (LTE) system), In order to perform the described various functions, the core network 104 may include multiple functionally separated entities having different network functions (Nfs). For example, the core network 104 may include an access and mobility management function (AMF) 130a, a session management function (SMF) 130b, and a policy and charging function (PCF) 130c. The listed functional objects may be implemented by at least one hardware device (e.g., a server). When functions of multiple functional objects are performed in a single device, the multiple functional objects may be implemented by multiple virtual machines.

The AMF 130a provides functions for access and mobility management in units of terminals. For example, the AMF 130a may support functions, such as signaling between core network objects for mobility between 3GPP access networks, termination of a control plane (CP) interface of a radio access network, termination of NAS signaling, NAS signaling security (e.g., NAS ciphering and integrity protection), AS security control, registration management (e.g., registration area management), connection management, idle mode terminal reachability (e.g., including control and execution of paging retransmission), mobility management control (e.g., subscription and policies), intra-system mobility and inter-system mobility support, support of network slicing, SMF selection, lawful intercept, providing a transfer of a session management (SM) message between a terminal and an SMF, a transparent proxy for SM message routing, access authentication, access authorization including a roaming authority check, providing a transfer of an SMS message between a terminal and an SMSF, a security anchor function (SEA), and security context management (SCM). Some or all of the functions of the AMF 130a may be supported within a single instance of one AMF 130a.

The SMF 130b provides a session management function. When a terminal has multiple sessions, the sessions may be managed by different SMFs 130b. For example, the SMF 130b may support functions, such as session management (e.g., session establishment, modification, and release, including tunnel maintenance between a UPF and an node), terminal IP address allocation and management, selection and control of a user plane (UP) function, configuring traffic steering for routing traffic to an appropriate destination in a UPF, termination of interfaces toward policy control functions, enforcement of a control part of a policy and a quality of service (QoS), lawful intercept (e.g., for an interface to an SM event and an L1 system), termination of an SM part of a NAS message, downlink data notification, an initiator of AN-specific SM information, SSC mode determination of a session, and roaming. Some or all of the functions of the SMF 130b may be supported within a single instance of one SMF 130b.

The PCF 130c receives information on a packet flow from an application server, and provides a function of determining policies, such as mobility management and session management. For example, the PCF 130c may support functions, such as support for a unified policy framework for controlling a network operation, providing of policy rules so as to enable a CP function (e.g., an AMF, an SMF, etc.) to execute the policy rules, and implementation of a front end to access relevant subscription information for policy determination in a user data repository (UDR).

Hereinafter, in various embodiments of the disclosure, a function provided by one of the aforementioned NFs may be referred to as a "service". One instance may support one or more services. If each service is implemented in a form of an identifiable instance, the service may be referred to as a "service instance". Service instances providing the same service may be grouped into a service set. Service instances belonging to one service set may exchange or share contexts with each other and provide the same service. Instances providing the same service may constitute a set, together, and instances belonging to one set may exchange or share contexts with each other and provide the same service. Between instances belonging to the same service set or set, even if a service or instance is changed according to a mobility or network state change of a terminal, service continuity or IP address preservation for the terminal may be supported.

An instance may be identified by realization of the NF defined in the 3GPP standard. That is, an instance may be understood as a hardware device implemented to perform an operation for at least one service and to transmit and receive information. Accordingly, an instance may be referred to as a "device" or a "node". That is, a device or a node may be understood as an instance within a virtualized system. One device or node may support one or more services, and each service may be realized so as to be also separated and implemented into at least one service instance in an identifiable form. If implemented as a virtual instance, a service instance may be included in an instance. Accordingly, in describing various embodiments of the disclosure, terms, such as "instance". "service instance", "device", and "node" may be used interchangeably.

Referring to FIG. 1, the terminal 120 may be connected to the radio access network 102 and may access a device that performs a mobility management function (MMF) of a 5G core network device. For example, the device that performs the MMF may be the AMF 130a. The AMF 130a may refer to a function or device responsible for both access of the radio access network 102 and mobility management of the terminal 120. The SMF 130b performs a session management function. The AMF 130a may be connected to the SMF 130b, and the AMF 130a may route a session-related message for the terminal 120 to the SMF 130b. The SMF 130b may be connected to a user plane function (UPF) to allocate a user plane resource to be provided to the terminal, thereby establishing a tunnel for data transmission between the base station 110 and the UPF. The PCF 130c may control information related to a QoS policy and charging with respect to a QoS flow of a PDU session used by the terminal 120. The PCF 130c may configure the PCC rule as described above and then transfer the same to the SMF 130b, the SMF 130b may provide, based on the PCC rule, a QoS profile to the radio access network 102, and the radio access network 102 may allocate a radio resource to the terminal 120 according to the QoS profile.

Figure 2:
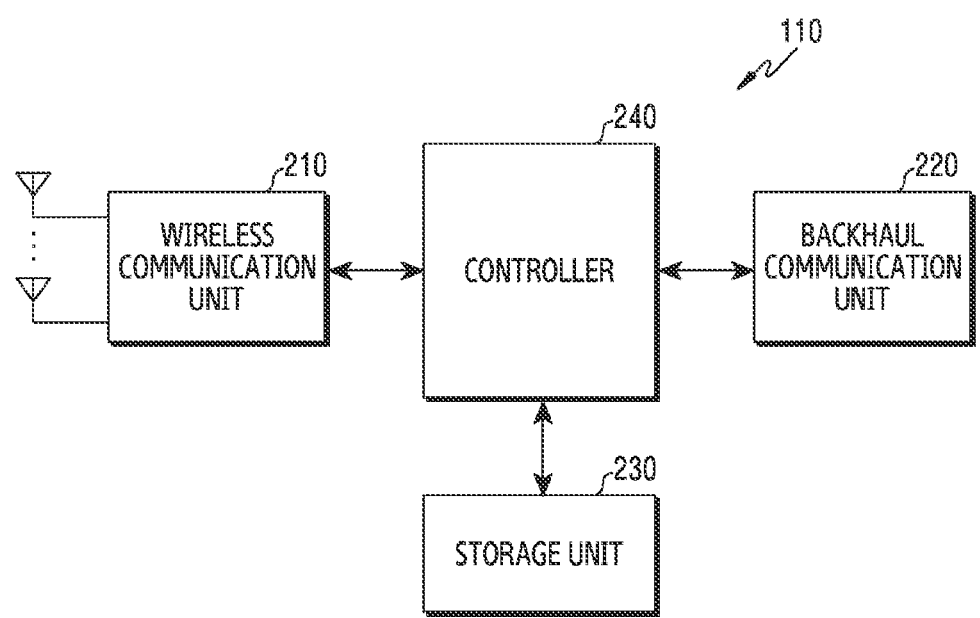
FIG. 2 illustrates a configuration of a base station in the wireless communication system according to various embodiments of the disclosure.

FIG. 2 illustrates a configuration of a base station in the wireless communication system according to various embodiments of the disclosure. The configuration illustrated in FIG. 2 may be understood as the configuration of the base station 110. The terms " . . . unit", " . . . device", etc. used hereinafter refer to a unit configured to process at least one function or operation, and may be implemented as hardware, software, or a combination of hardware and software.

Referring to FIG. 2, the base station includes a wireless communication unit 210, a backhaul communication unit 220, a storage unit 230, and a controller 240.

The wireless communication unit 210 performs functions to transmit or receive a signal via a wireless channel. For example, the wireless communication unit 210 performs a function of conversion between a baseband signal and a bitstream according to a physical layer specification of a system. For example, during data transmission, the wireless communication unit 210 generates complex symbols by encoding and modulating a transmission bitstream. When receiving data, the wireless communication unit 210 restores a reception bitstream by demodulating and decoding a baseband signal.

Further, the wireless communication unit 210 up-converts a baseband signal to a radio frequency (RF) band signal, transmits the up-converted RF band signal via an antenna, and then down-converts the RF band signal received via the antenna to a baseband signal. To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include multiple transmission/reception paths. Further, the wireless communication unit 210 may include at least one antenna array including multiple antenna elements.

In terms of hardware, the wireless communication unit 210 may include a digital unit and an analog unit, wherein the analog unit includes multiple sub-units according to an operation power, an operation frequency, and the like. The digital unit may be implemented as at least one processor (e.g., a digital signal processor (DSP)).

The wireless communication unit 210 transmits and receives a signal as described above. Accordingly, all or a part of the wireless communication unit 210 may be referred to as a "transmitter", a "receiver", or a "transceiver". In the following description, transmission and reception performed via a wireless channel are used in a sense including processing performed as described above by the wireless communication unit 210.

The backhaul communication unit 220 provides an interface to perform communication with other nodes within a network. That is, the backhaul communication unit 220 converts, into a physical signal, a bitstream transmitted from a base station to another node, for example, another access node, another base station, a higher node, a core network, etc., and converts a physical signal received from another node into a bitstream.

The storage unit 230 stores data, such as a basic program, an application program, configuration information, and the like for operation of the base station. The storage unit 230 may include a volatile memory, a non-volatile memory, or a combination of a volatile memory and a non-volatile memory. The storage unit 230 provides stored data in response to a request of the controller 240.

The controller 240 controls overall operations of the base station. For example, the controller 240 transmits and receives a signal via the wireless communication unit 210 or the backhaul communication unit 220. Further, the controller 240 records and reads data in the storage unit 230. The controller 240 may perform functions of a protocol stack required by the communication standard. According to another implementation example, the protocol stack may be included in the wireless communication unit 210. To this end, the controller 240 may include at least one processor. According to various embodiments, the controller 240 may control the base station to perform operations according to various embodiments described below.

Figure 3:
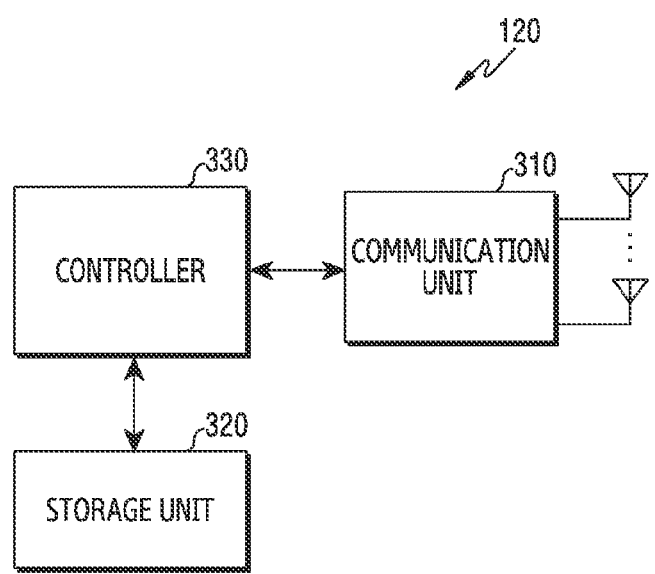
FIG. 3 illustrates a configuration of a terminal in the wireless communication system according to various embodiments of the disclosure.

FIG. 3 illustrates a configuration of a terminal in the wireless communication system according to various embodiments of the disclosure. The configuration illustrated in FIG. 3 may be understood as a configuration of the terminal 120. The terms " . . . unit", " . . . device", etc. used hereinafter refer to a unit configured to process at least one function or operation, and may be implemented as hardware, software, or a combination of hardware and software.

Referring to FIG. 3, the terminal may include a communication unit 310, a storage unit 320, and a controller 330.

The communication unit 310 performs functions for transmitting or receiving a signal via a wireless channel. For example, the communication unit 310 performs a function of conversion between a baseband signal and a bitstream according to a physical layer specification of the system. For example, during data transmission, the communication unit 310 generates complex symbols by encoding and modulating a transmission bitstream. When receiving data, the communication unit 310 restores the received bitstream by demodulating and decoding the baseband signal. The communication unit 310 up-converts the baseband signal into an RF band signal, transmits the up-converted RF band signal via an antenna, and then down-converts the RF band signal received via the antenna into a baseband signal. For example, the communication unit 310 may include a transmission filter, a reception filter, an amplifier, a mixer, an oscillator, a DAC, an ADC, and the like.

Also, the communication unit 310 may include multiple transmission/reception paths, further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package. The communication unit 310 may include multiple RF chains. Further, the communication unit 310 may perform beamforming.

The communication unit 310 transmits and receives a signal as described above. Accordingly, all or a part of the communication unit 310 may be referred to as "transmitter", "receiver", or "transceiver". In the following description, transmission and reception performed via a wireless channel are used in a sense including processing performed as described above by the communication unit 310.

The storage unit 320 stores data, such as a basic program, an application program, configuration information, and the like for operation of the terminal. The storage unit 320 may include a volatile memory, a non-volatile memory, or a combination of a volatile memory and a non-volatile memory. The storage unit 320 provides stored data in response to a request of the controller 330.

The controller 330 controls overall operations of the terminal. For example, the controller 330 transmits and receives a signal via the communication unit 310. Further, the controller 330 records and reads data in the storage unit 320. The controller 330 may perform functions of a protocol stack required by the communication standard. To this end, the controller 330 may include at least one processor or a micro-processor, or may be a part of a processor. A part of the communication unit 310 and the controller 330 may be referred to as a communication processor (CP). According to various embodiments, the controller 330 may control the terminal to perform operations according to various embodiments described below.

Figure 4:
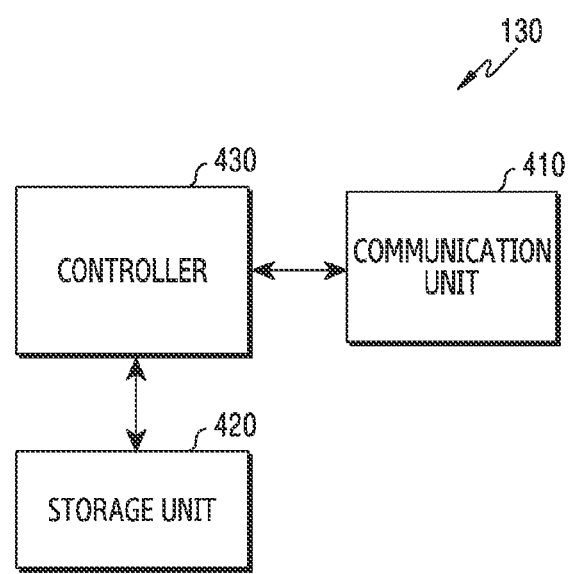
FIG. 4 illustrates a configuration of a core network device in the wireless communication system according to various embodiments of the disclosure.

FIG. 4 illustrates a configuration of a core network device in the wireless communication system according to various embodiments of the disclosure. The structure illustrated in FIG. 4 may be understood as a configuration of a device having at least one function from among the AMF 130a, the SMF 130b, and the PCF 130c of FIG. 1. The terms " . . . unit", " . . . device", etc. used hereinafter refer to a unit configured to process at least one function or operation, and may be implemented as hardware, software, or a combination of hardware and software.

Referring to FIG. 4, the core network device includes a communication unit 410, a storage unit 420, and a controller 430.

The communication unit 410 provides an interface to perform communication with other devices within the network. That is, the communication unit 410 converts, into a physical signal, a bitstream transmitted from the core network device to another device, and converts a physical signal received from another device into a bitstream. That is, the communication unit 410 may transmit or receive a signal. Accordingly, the communication unit 410 may be referred to as a modem, a transmitter, a receiver, or a transceiver. The communication unit 410 enables the core network device to communicate with other devices or systems via a network or a backhaul connection (e.g., a wired backhaul or a radio backhaul).

The storage unit 420 stores data, such as a basic program, an application program, and configuration information for an operation of the core network device. The storage unit 420 may include a volatile memory, a non-volatile memory, or a combination of a volatile memory and a non-volatile memory. The storage unit 420 provides stored data in response to a request of the controller 430.

The controller 430 controls overall operations of the core network device. For example, the controller 430 transmits and receives a signal via the communication unit 410. Further, the controller 430 records and reads data in the storage unit 420. To this end, the controller 430 may include at least one processor. According to various embodiments, the controller 430 may control the core network device to perform operations according to various embodiments to be described below.

NFs define respective services provided thereby, which are defined in the standard as, Npcf, Nsmf, Namf, Nnef, and the like. For example, when the AMF 130a transfers a session-related message to the SMF 130b, a service referred to as "Nsmf_PDUSession_CreateSMContext" or an application programming interface (API) may be used.

According to various embodiments of the disclosure, the base station 110 may notify a 5G core network about a QoS level of a radio bearer supportable to the terminal 102, and based on this, the 5G core network may change or add a QoS flow of a protocol data unit (PDU) session used by the terminal, according to an appropriate QoS level. According to an embodiment, when the QoS level which may be provided to the terminal 120 is lowered due to deterioration of a wireless condition, the base station 110 may induce application of a QoS flow of a lower QoS level by notifying of the same to the 5G core network. When the QoS level which may be provided increases due to improvement of a wireless condition, the base station 110 may induce application of a QoS flow of a higher QoS level by notifying of the same to the 5G core network.

According to an embodiment, when requesting establishment of a guaranteed bit rate (GBR) QoS flow from the base station 110, even if the wireless network is congested, the SMF 130b may indicate establishment of the GBR QoS flow when the network condition improves, by queuing the establishment of the QoS flow without rejecting the same. The SMF (130b) may transmit a QoS flow establishment message including an indication for the above operation to the base station 110, may include the indication in an alternative QoS profile, or may configure a guaranteed flow bit rate (GFBR) value to 0 Kbps in the alternative QoS profile, thereby indicating the above operation. Even if the wireless network condition is not good so that the GBR QoS flow cannot be supported, the base station having received the request may queue establishment of the corresponding QoS flow without rejecting the request until the QoS flow can be established. During a handover between base stations, a target base station 803 may not be able to support a GBR QoS flow to be handed over due to a wireless network condition. If information received from a source base station 801 includes an indication as described above (an indication causing, even if the wireless network is congested, queuing for establishment of the corresponding GBR QoS flow, without rejecting the same, and enabling establishment of the GBR QoS flow when the network condition improves), the target base station 803 may accept the handover of the corresponding GBR QoS flow without rejecting the same. Accordingly, when establishment of the GBR QoS flow or establishment of a data radio bearer corresponding thereto is queued, and the network condition improves, the target base station 803 may establish the GBR QoS flow and the data radio bearer (DRB) corresponding thereto.

According to various embodiments, a third-party application server may determine a QoS level currently used by the terminal 120 and may change a level of a service provided to the terminal 120, according to a QoS level negotiated with the 5G core network. For example, an application server that provides an autonomous driving service may adjust an autonomous driving level (a level of automation) according to the QoS level currently used by the terminal. Accordingly, the application server may change an autonomous driving mode from a fully autonomous driving mode to a driver intervention mode or from the driver intervention mode to the fully autonomous driving mode.

In addition, when providing an augmented reality (AR)/virtual reality (VR) service, the application server may determine to what extent high-quality AR/VR services are supported, according to the QoS level notified by the 5G system. Alternatively, the application server may support an adaptive streaming function that adjusts an image quality according to a network condition.

According to various embodiments, when the terminal 120 moves and a handover thus occurs, the target base station 803 may notify of the QoS level, which can be provided to the terminal 120, to the 5G core network during the handover, so that a QoS flow according to the QoS level can be more quickly applied.

According to an embodiment, when a guaranteed bit rate (GBR) QoS flow is required for a PDU session used by the terminal 120, an event of monitoring the QoS level which is currently supportable to the terminal 120 may be configured for the base station 110. Based on this, the base station 110 may determine the QoS level which can be provided to the terminal 120, and may inform of the same to the core network 104.

According to an embodiment, when the terminal 120 performs a handover to another base station, the target base station 803 may identify QoS level monitoring information configured for the corresponding terminal 120, may determine a QoS level supportable by the target base station 803 with respect to the identified information, and may inform the core network 104 of the QoS level.

According to an embodiment, when the guaranteed bit rate (GBR) QoS flow is required for the PDU session used by the terminal 120, a function to notify about a QoS level (e.g., an alternative QoS profile) currently supportable to the terminal 120 may be configured for the base station 110. Based on this, the base station 110 may determine the QoS level (e.g., an alternative QoS profile or a QoS parameter value corresponding thereto, for example, a GFBR, a packet error rate (PER), or a packet delay budget (PDB)) supportable to the terminal 120, and may inform of the same to the core network 104.

According to an embodiment, when the terminal 120 performs a handover to another base station, the target base station 803 may identify QoS level monitoring information (e.g., an alternative QoS Profile) configured for the corresponding terminal, and may determine the QoS level (e.g., an alternative QoS profile or a QoS parameter value corresponding thereto, for example, a GFBR, a PER, or a PDB) supportable by the target base station 803 with respect to the identified information, and may inform the core network 104 of the QoS level.

The base station 110 according to an embodiment may receive a request QoS profile together with a QoS flow establishment request from the terminal 120, the 5G core network, or another base station. The base station 110 having received the QoS flow establishment request may establish a QoS flow that satisfies the request QoS profile. Alternatively, the base station 110 having received the QoS flow establishment request may reject the QoS flow establishment request when the base station 110 is in a congested situation (e.g., in a case of a congested situation or a congested NG-RAN (NG-RAN)), in consideration of a current radio network resource of the base station 110.

The base station 110 according to an embodiment may support an alternative QoS profile function. The base station 110 supporting the alternative QoS profile function may receive a QoS profile list together with a QoS flow establishment request from the terminal 120, the 5G core network, or another base station. The QoS profile list may include one request QoS profile and one or more alternative QoS profiles. The base station 110 having received the QoS profile list may select a highest QoS profile, which may be provided by the base station 110 from the QoS profile list, and may establish a QoS flow in consideration of a current radio network resource of the base station 110.

The base station 110 according to an embodiment may support a QoS flow establishment (establishment of a QoS flow) pending function. The base station 110 supporting the QoS flow establishment pending function may receive a request QoS profile together with a QoS flow establishment request from the terminal 120, the 5G core network, or another base station. The base station 110 which has received the QoS flow establishment request and supports the QoS flow establishment pending function may, when the base station 110 is in a congested situation (e.g., in a case of a congested situation or a congested NG-RAN (NG-RAN)), store the QoS flow establishment request and related information (e.g., request QoS profiles, etc.) in a queue managed by the base station 110, in consideration of a current radio network resource of the base station 110. When the congested situation is resolved, the base station 110 may process the QoS flow establishment request stored in the queue so as to establish a QoS flow that satisfies the request QoS profile.

The base station 110 according to an embodiment may support the alternative QoS profile function and the QoS flow establishment pending function. The base station 110 which supports the alternative QoS profile function and the QoS flow establishment pending function may receive a QoS profile list together with a QoS flow establishment request from the terminal 120, the 5G core network, or another base station. The base station 110 having received the QoS flow establishment request may, when the base station 110 is in a congested situation (e.g., in a case of a congested situation or a congested NG-RAN) store the QoS flow establishment request and related information (e.g., request QoS profiles, etc.) in a queue managed by the base station, in consideration of a current radio network resource of the base station 110. When the congested situation is resolved, the base station 110 may process the QoS flow establishment request stored in the queue so as to establish a QoS flow by selecting a highest QoS profile which may be provided by the base station from the QoS profile list.

Here, supporting of the alternative QoS profile function may be understood as that the QoS flow establishment pending function is also supported.

For example, the base station 110 and/or NG-RAN nodes may perform an Xn setup procedure. The purpose of the Xn setup procedure is to exchange application level configuration data between two NG-RAN nodes. The Xn setup procedure is a signaling procedure irrelevant to a terminal (non-UE-associated signaling procedure).

Figure 5:
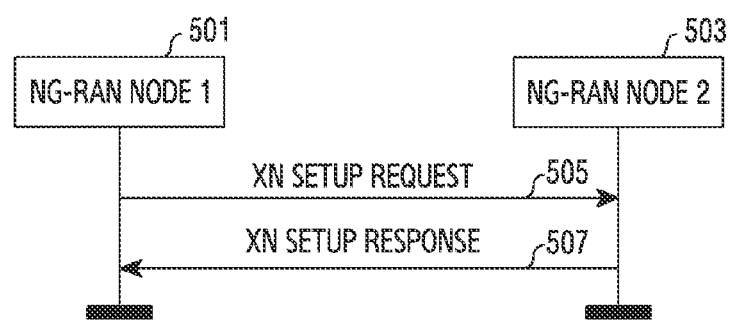
FIG. 5 illustrates an Xn setup procedure in the wireless communication system according to various embodiments of the disclosure.

FIG. 5 illustrates an Xn setup procedure in the wireless communication system according to various embodiments of the disclosure.

Referring to FIG. 5, in operation 505, an NG-RAN node 1 501 transmits an XN setup request message to an NG-RAN node 2 503. Via this, the NG-RAN node 1 501 may initiate an Xn setup procedure. The XN setup request message may include information on capability supported by the NG-RAN node 1 501.

For example, when the NG-RAN node 1 501 supports the alternative QoS profile function, the XN setup request message may include information indicating that the alternative QoS profile function is supported. Alternatively, for example, when the NG-RAN node 1 501 does not support the alternative QoS profile function, the XN setup request message may not include information indicating that the alternative QoS profile function is supported.

For example, when the NG-RAN node 1 501 supports the QoS flow establishment pending function, the XN setup request message may include information indicating that the QoS flow establishment pending function is supported. Alternatively, for example, when the NG-RAN node 1 501 does not support the QoS flow establishment pending function, the XN setup request message may not include information indicating that the QoS flow establishment pending function is supported.

In operation 507, the NG-RAN node 2 503 having received the XN setup request message transmits an XN setup response message to the NG-RAN node 1 501. The XN setup response message may include information on capability supported by the NG-RAN node 2 503.

For example, when the NG-RAN node 2 503 supports the alternative QoS profile function, the XN setup response message may include information indicating that the alternative QoS profile function is supported. Alternatively, for example, when the NG-RAN node 2 503 does not support the alternative QoS profile function, the XN setup response message may not include information indicating that the alternative QoS profile function is supported.

For example, when the NG-RAN node 2 503 supports the QoS flow establishment pending function, the XN setup response message may include information indicating that the QoS flow establishment pending function is supported. Alternatively, for example, when the NG-RAN 2 does not support the QoS flow establishment pending function, the XN setup response message may not include information indicating that the QoS flow establishment pending function is supported.

The NG-RAN node 1 501 and the NG-RAN node 2 503 according to various embodiments may exchange and store capability information supported by the base station 110, via the Xn setup procedure illustrated in FIG. 5. In a subsequent procedure, the base station 110 may use capability information of another base station, which is stored in the base station 110.

Figure 6:
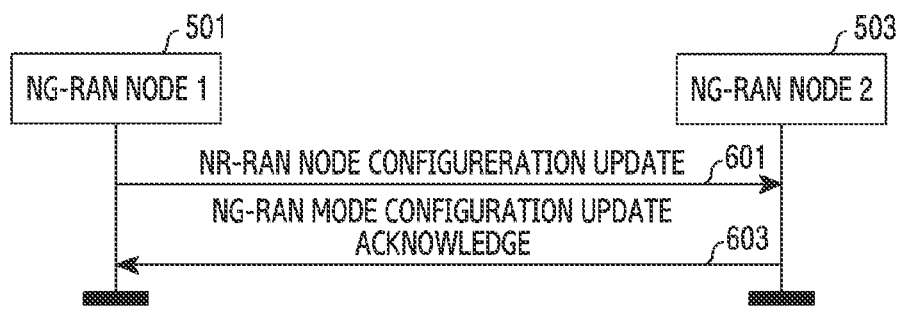
FIG. 6 illustrates a base station configuration update procedure in the wireless communication system according to various embodiments of the present disclosure.

FIG. 6 illustrates a base station configuration update procedure in the wireless communication system according to various embodiments of the present disclosure. According to an embodiment, the base station 110 may update, via a procedure of FIG. 6, the capability information exchanged via the procedure illustrated in FIG. 5.

Referring to FIG. 6, in operation 601, the NG-RAN node 1 501 transmits an NG-RAN node configuration update message to the NG-RAN node 2 503. The NG-RAN node configuration update message may include capability information (e.g., whether the alternative QoS profile function is supported, whether the QoS flow establishment pending function is supported, etc.) to be updated. In operation 603, the NG-RAN node 2 503 transmits an NG-RAN node configuration update acknowledgment (ACK) message to the NG-RAN node 1 501.

Figure 7:
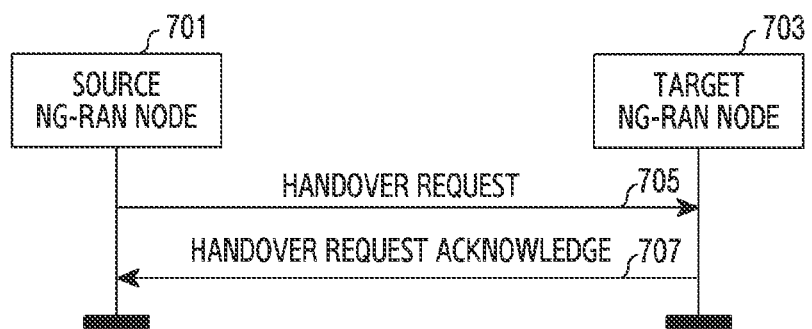
FIG. 7 illustrates a handover preparation procedure in the wireless communication system according to various embodiments.

FIG. 7 illustrates a handover preparation procedure in the wireless communication system according to various embodiments.

Referring to FIG. 7, in operation 705, a source NG-RAN node 701 transmits a handover request message to a target NG-RAN node 703. During a handover preparation procedure, the source NG-RAN node 701 and the target NG-RAN node 703 may exchange function information supported by each other. For example, the source NG-RAN node 701 may include, in the handover request message, capability information (e.g., information on alternative QoS profile capability, QoS flow establishment pending capability, etc.) supported by the source NG-RAN node 701.

In operation 707, the target NG-RAN node 703 transmits a handover request acknowledgment (ACK) message to the source NG-RAN node 701. The target NG-RAN node 703 may include, in the handover request ACK message, capability information (e.g., information on the alternative QoS profile function, the QoS flow establishment pending function, etc.) supported by the target NG-RAN node 703.

The terminal 120 may establish a PDU session by accessing the source base station 801 (e.g., a source NG-RAN). The PDU session may include one or more QoS flows. When a handover occurs as in the procedure illustrated in FIG. 7, the source base station 801 may provide the target base station 803 (e.g., a target NG-RAN) with the PDU session of the terminal 120 and QoS flow information associated with the PDU session. Based on the information received from the source base station 801, the target base station 803 may establish a QoS flow, and may continuously provide the PDU session of the terminal 120.

Figure 8:
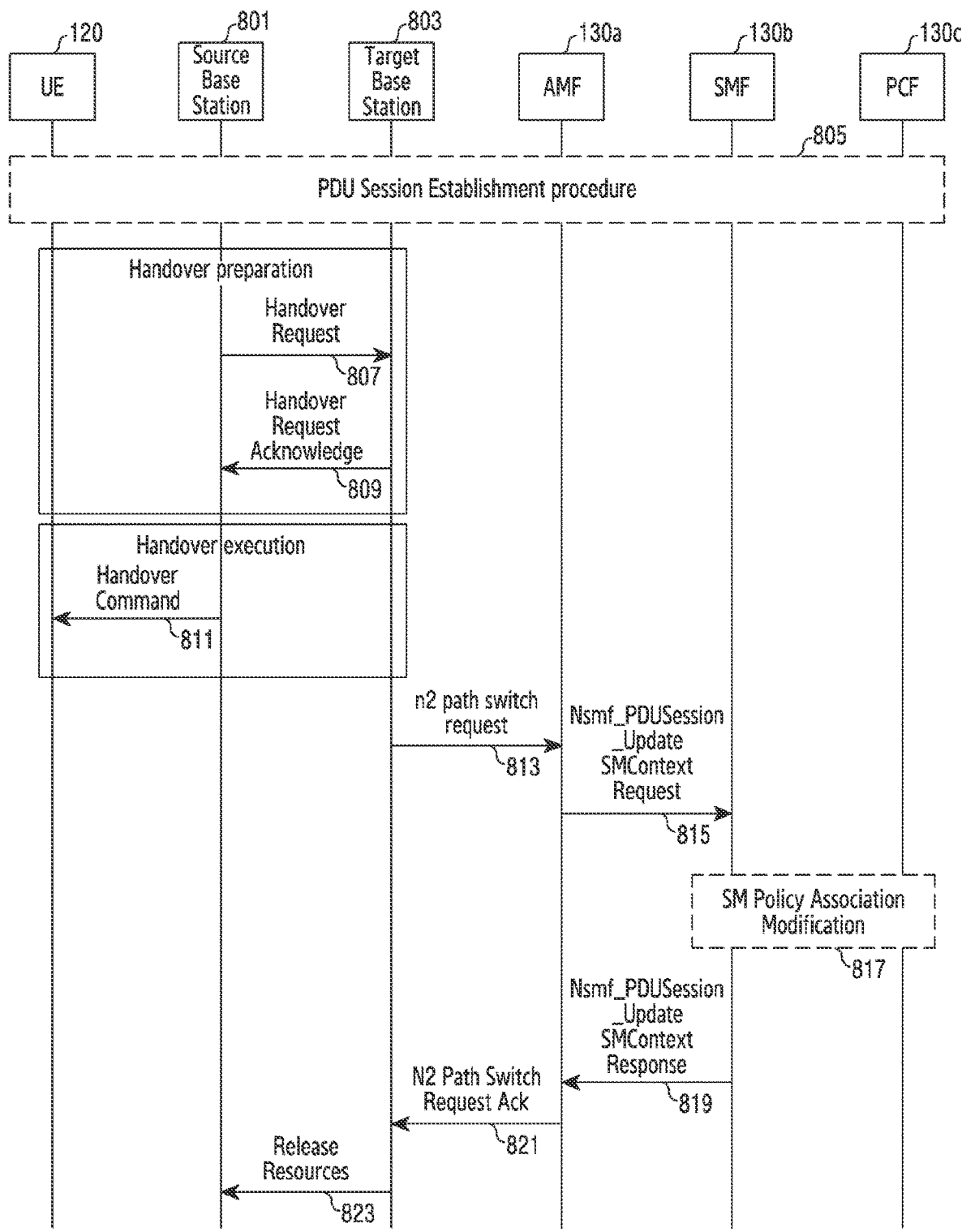
FIG. 8 illustrates an Xn-based handover procedure in the wireless communication system according to various embodiments of the disclosure.

FIG. 8 illustrates an Xn-based handover procedure in the wireless communication system according to various embodiments of the disclosure. FIG. 8 is an example of an Xn-based handover procedure and may be applied to various cases, such as a first case in which the source base station 801 supports the alternative QoS profile function, and the target base station 803 does not support the alternative QoS profile function, a second case in which the source base station 801 supports the alternative QoS profile function and/or the QoS flow establishment pending function, or a third case in which the source base station 801 does not support the alternative QoS profile function and/or the QoS flow establishment pending function, and the target base station 803 supports the alternative QoS profile function and/or the QoS flow establishment pending function.

Hereinafter, an embodiment in which the source base station 801 supports the alternative QoS profile function and the target base station 803 does not support the alternative QoS profile function will be described with reference to FIG. 8.

Referring to FIG. 8, in operation 805, the terminal 120 may perform a PDU session establishment procedure. According to an embodiment, the source base station 801 (e.g., a source NG-RAN) serving the terminal 120 may select a highest QoS profile that the base station may provide from a QoS profile list, in consideration of a radio network resource of the source base station 801, and may establish a QoS flow. For example, the source base station 801 may not satisfy a request QoS profile in the QoS profile list, but may satisfy a second QoS profile among alternative QoS profiles, and therefore a QoS flow that provides QoS corresponding to the second QoS profile among the alternative QoS profiles may be established.

In operation 807, the source base station 801 transmits a handover request message to the target base station 803 (e.g., a target NG-RAN). According to an embodiment, the source base station 801 serving the terminal 120 may prepare for a handover. Based on at least one of a measurement report received from the terminal 120 and neighbor base station capability information obtained from a neighbor base station through the Xn setup procedure shown in FIG. 6, the source base station 801 may determine the target base station 803 to which the handover is to be performed.

According to an embodiment, based on information stored via the procedure illustrated in FIG. 6, the source base station 801 may be informed that the target base station 803 to which the source base station 801 has determined to perform handover does not support the alternative QoS profile function. Accordingly, the source base station 801 may select one QoS profile from the QoS profile list stored and managed by the source base station 801, and may include the same in the handover request message transmitted to the target base station 803 in operation 807. For example, the source base station 801 may select a QoS profile corresponding to the QoS flow currently provided by the source base station 801, that is, the second QoS profile among the alternative QoS profiles, and may include the same in the handover request message in operation 807. Alternatively, the source base station 801 may select the request QoS profile from the QoS profile list, and may include the same in the handover request message in operation 807. Alternatively, the source base station 801 may select a highest QoS profile from the QoS profile list and may include the same in the handover request message in operation 807.

Via the above-described operation, the source base station 801 may determine the target base station 803, and may transfer, to the target base station 803, an access stratum (AS) context of the terminal 120, radio resource control (RRC) information currently used by the terminal 120, and data radio bearer (DRB) information. The target base station 803 may configure a DRB of the terminal 120 according to received QoS information.

In operation 809, the target base station 803 transmits a handover request ACK message to the source base station 801. That is, the target base station 803 may inform the source base station 801 that execution of the handover has been prepared, and may also inform the source base station 801 of RRC information necessary for the terminal 120 to access the target base station 803.

In operation 811, the source base station 801 transmits a handover command message to the terminal 120. The source base station 801 serving the terminal 120 transmits a command to handover the terminal 120 to the target base station 803, based on information received from the target base station 803. Accordingly, the terminal 120 may access the target base station 803. Therefore, the terminal 120 may successfully access the target base station 803 and may continue to perform data transmission/reception according to the DRB allocated by the target base station 803.

In operation 813, the target base station 803 transmits an N2 path switch request message to the AMF 130a. The target base station may transmit, to the AMF 130a, the N2 path switch request message informing that the target base station itself is serving the terminal.

In operation 815, the AMF 130a transmits an Nsmf PDU session update session management context request (Nsmf PDU session update SM context request) message to the SMF 130b. The AMF 130a having received the N2 path switch request message may transfer, to the SMF 130b via operation 815, the N2 session management (SM) message received from the base station. Based on the message received in operation 815, the SMF 130b may be informed that target base station 803 does not support the alternative QoS profile function. For example, as the message in operation 815 does not include alternative QoS profile-related information, the SMF 130b may be informed that the target base station 803 does not support the alternative QoS profile function. Accordingly, the following operation 817 may be performed.

In operation 817, the SMF 130b performs an SM policy association modification procedure with the PCF 130c. For example, the SMF 130b may identify that the QoS profile provided by the source base station 801 for the QoS flow is different from the QoS profile provided by the target base station 803, and may perform the procedure of operation 817 with the PCF 130c. The PCF 130c may change (e.g., upgrade or downgrade QoS) the QoS flow of the PDU session used by the terminal 120, or may transfer an updated QoS rule to the SMF 130b in order to apply a new GBR QoS flow.

In operation 819, the SMF 130b transmits an Nsmf PDU session update session management context response (Nsmf PDU session update SM context response) message to the AMF 130a. The SMF 130b may perform an N4 session change procedure with a UPF, based on the QoS rule received from the PCF 130c. For example, the SMF 130b may configure a QoS profile, based on the QoS rule received from the PCF 130c and may transfer the message to the AMF in order to transmit the N2 SM message to the target base station. Although not illustrated in FIG. 8, the AMF may transmit, to the SMF 130b, ACK for the message received from the SMF.

In operation 821, the AMF 130a transmits an N2 path switch request acknowledgment (ACK) message to the target base station 803. That is, the AMF 130a transmits a response message in response to operation 813, and in this case, the N2 SM message received from the SMF 130b via operation 819 may be included in the response message. The target base station having received the message may reconfigure the DRB of the terminal according to newly received QoS information.

In operation 823, the target base station 803 transmits a resource release (release resources) message to the source base station 801. According to an embodiment, the target base station 803 may transfer, to the source base station 801, signaling indicating that the release of the resource provided to the existing terminal is permitted.

Hereinafter, an embodiment of a case in which the source base station 801 supports the alternative QoS profile function and/or the QoS flow establishment pending function will be described with reference to FIG. 8.

The source base station 801 according to an embodiment may not be able to process a QoS flow establishment request due to occurrence of congestion, and may store the QoS flow establishment request and related information (e.g., a request QoS profile list, etc.) in a queue managed by the source base station. In this case, if the Xn-based handover procedure illustrated in FIG. 7 occurs, the source base station 801 may configure a handover request message in operation 807 in various ways as follows.

According to an embodiment, the source base station 801 may include an indication, which indicates that the current QoS flow of the terminal is in a pending state, in the handover request message in operation 807 of transmission to the target base station 803.

According to an embodiment, the source base station 801 may configure 0 kbit/s as the QoS profile of the QoS flow of the terminal and may include the same in the handover request message in operation 807 of transmission to the target base station 803.

According to an embodiment, the source base station 801 may select a request QoS profile from the QoS profile list, as the QoS profile of the QoS flow of the terminal 120 and may include the same in the handover request message in operation 807 of transmission to the target base station 803.

According to an embodiment, the source base station 801 may select a highest QoS profile from the QoS profile list, as the QoS profile of the QoS flow of the terminal 120 and may include the same in the handover request message in operation 807 of transmission to the target base station 803.

According to an embodiment, the source base station 801 may include, in the handover request message in operation 807 of transmission to the target base station 803, time information (e.g., timestamp) on a time at which the QoS flow establishment request has first entered a queue, or information (e.g., an elapsed time and an elapsed pending time) on a time that elapsed from the time the QoS flow establishment request has entered the queue to the present time.

In operation 807, the target base station 803 having received the message may determine that the QoS flow of the terminal 120 is in a pending state, based on the received information. If the target base station 803 having received the handover request in operation 807 is also in a congestion situation, the target base station 803 may determine to store the QoS flow request received in operation 807 in the queue of the target base station 803. In this case, the target base station 803 may identify the timestamp or elapsed pending time received in operation 807, and may determine a waiting order of the QoS flow establishment request which is to be stored in the queue and is received in operation 807. The target base station 803 may compare the timestamp or elapsed pending time of the establishment request message stored in the queue of the target base station 803 with the timestamp or elapsed pending time of the request message received in operation 807, thereby queuing, in chronological order, the request message received in operation 807. For example, if 5 QoS flow establishment requests are currently queued in the queue of the target base station 803, and the timestamp or elapsed pending time of the QoS flow establishment request received in operation 807 precedes the 5 requests currently stored in the queue, the target base station 803 may input the request received in operation 807 to the front of the queue.

Operations of the target base station 803 having received the handover request of operation 807 is as follows.

The target base station 803 according to an embodiment may, in consideration of the current radio network resource of the target base station 803, determine whether the QoS flow-associated QoS profile, request QoS profile, or QoS profile list included in the handover request message received in operation 807 can be satisfied. If satisfied, the target base station 803 may configure the DRB of the terminal according to the QoS information received in operation 807. If not satisfied, the target base station 803 may configure the DRB of the terminal according to a QoS profile, which the base station may currently satisfy, in the QoS information (e.g., the alternative QoS list) received in operation 807, Alternatively, if not satisfied, the target base station may reject or release the QoS flow in operation 807.

Hereinafter, descriptions will be provided with reference to FIG. 8 for an embodiment in which the source base station 801 does not support the alternative QoS profile function and/or the QoS flow establishment pending function, and the target base station 803 supports the alternative QoS profile function and/or the QoS flow establishment pending function.

In operation 805, the terminal 120 performs a MU session establishment procedure. The source base station 801 serving the terminal 120 may establish a QoS flow providing QoS corresponding to a request QoS profile. The PDU session established in operation 805 is a PDU session requiring the alternative QoS profile function, but since the source base station 801 does not support the alternative QoS profile function, the PDU session may be established without the alternative QoS profile function.

In operation 807, the source base station 801 transmits a handover request message to the target base station 803 (e.g., a target NG-RAN). The source base station 801 serving the terminal may prepare for a handover. Based on at least one of a measurement report received from the terminal and neighbor base station function information obtained from a neighbor base station via the Xn setup procedure illustrated in FIG. 2, the source base station 801 may determine the target base station to which the handover is to be performed.

According to an embodiment, the source base station 801 may include the QoS profile or the request QoS profile associated with the current QoS flow, in the handover request message transmitted to the target base station 803 in operation 807.

Via this operation, the source base station 801 may determine the target base station 803, and may transfer, to the target base station 803, an access stratum (AS) context of the terminal 120, RRC information currently used by the terminal 120, and DRB information. The target base station 803 may configure a DRB of the terminal 120 according to received QoS information.

Since the target base station 803 has failed to receive alternative QoS profile-related information from the source base station 801 in operation 807, the target base station 803 may not be informed whether the PDU session is a PDU session requiring the alternative QoS profile function. Accordingly, the target base station 803 may establish a QoS flow, to which the alternative QoS profile function is not applied, based on the information received in operation 807.

In operation 809, the target base station 803 transmits a handover request ACK message to the source base station 801. The target base station 803 may inform the source base station 801 that execution of the handover has been prepared, and may also inform the source base station 801 of RRC information necessary for the terminal 120 to access the target base station 803.

In operation 811, the source base station 801 may transmit a handover command message to the terminal 120. The source base station 801 serving the terminal 120 transmits a command to handover the terminal 120 to the target base station 803, based on information received from the target base station 803. Accordingly, the terminal 120 may access the target base station 803. Therefore, the terminal 120 may successfully access the target base station 803 and may continue to perform data transmission/reception according to the DRB allocated by the target base station 803.

In operation 813, the target base station 803 transmits an N2 path switch request message to the AMF 130a. The target base station 803 may transmit, to the AMF 130a, the N2 path switch request message informing that the target base station itself is serving the terminal. In this case, the message in operation 813 may include information (e.g., indication) indicating that the target base station supports the alternative QoS profile function and/or the QoS flow establishment pending function.

In operation 815, the AMF transmits an Nsmf PDU session update session management context request (Nsmf PDU session update SM context request) message to the SMF. The AMF 130a having received the message in operation 813 may transfer, to the SMF 130b via operation 815, the N2 SM message received from the base station. Based on the message received in operation 815, the SMF 130b may be informed that the target base station 803 supports the alternative QoS profile and/or the QoS flow establishment pending function. Accordingly, the SMF 130b may perform operation 817.

In operation 817, the SMF 130b may perform an SM policy-associated modification procedure (SM policy association modification) with the PCF 130c. For example, as the source base station 801 does not support the alternative QoS profile and/or the QoS flow establishment pending function, while the target base station 803 supports the alternative QoS profile and/or the QoS flow establishment pending function, the SMF 130b may perform the procedure of operation 817 with the PCF 130c in order to provide an alternative QoS profile to the target base station. The PCF 130c may transfer the alternative QoS profile list and/or a QoS rule associated thereto to the SMF 130b in order to change (e.g., upgrade or downgrade QoS) the QoS flow of the PDU session used by the terminal 120 or to apply a new GBR QoS flow.

In operation 819, the SMF 130b may transmit an Nsmf PDU session update session management context response (Nsmf PDU session update SM context response) message to the AMF 130a. The SMF 130b may configure the alternative QoS Profile list, based on the QoS rule received from the PCF 130c, and may transfer the message to the AMF 130a in order to transmit the N2 SM message to the target base station 803. The AMF 130a may transmit ACK for the message to the SMF 130b.

In operation 821, the AMF 130a may transmit an N2 path switch request acknowledgment (ACK) message to the target base station 803. The AMF 130a transmits a response message in response to operation 813, and in this case, the N2 SM message received from the SMF 130b via operation 817 may be included in the response message. The target base station 803 having received the message may apply the alternative QoS profile received from the SMF 130b. For example, the target base station 803 may compare the QoS profile (e.g., based on the QoS information received in operation 807) of the QoS flow currently provided by the target base station 803 with the alternative QoS profile received in operation 821. If a higher QoS profile than the current QoS profile exists in the alternative QoS profile, and the target base station 803 is able to provide the higher QoS profile, the target base station 803 may upgrade QoS to the higher QoS profile. Accordingly, the target base station 803 may reconfigure the DRB of the terminal according to the QoS profile.

In operation 823, the target base station 803 transmits a resource release (release resources) message to the source base station 801. According to an embodiment, the target base station 803 may transfer, to the source base station 801, signaling indicating that the release of the resource provided to the existing terminal 120 is permitted.

Figure 9:
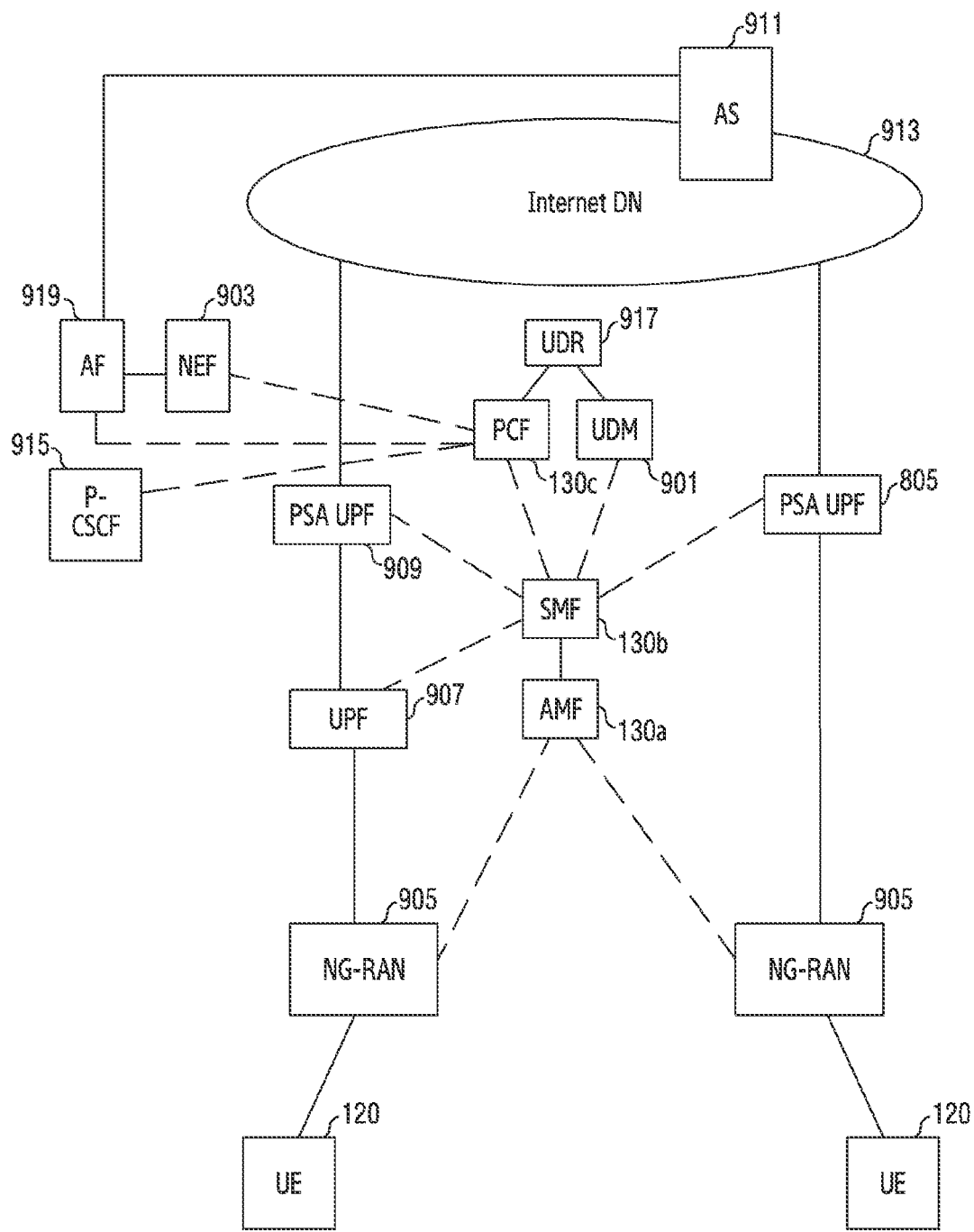
FIG. 9 illustrates a 5G system structure in the wireless communication system according to various embodiments of the disclosure.

FIG. 9 illustrates a 5G system structure in the wireless communication system according to various embodiments of the disclosure.

Referring to FIG. 9, descriptions of network entities and/or network nodes are as follows.

The core network of 5G may include the following network functions. The access and mobility management function (AMF) 130a may be a network function to manage mobility of the terminal 120. The session management function (SMF) 130b may be a network function to manage a packet data network connection provided to the terminal 120. The connection may be collectively referred to as a protocol data unit (PDU) session. A policy and charging function (PCF) 130c may be a network function that applies, to the terminal 120, a service policy of a mobile communication operator, a charging policy, and a policy for a PDU session, Unified data management (UDM) 901 may be a network function that stores information on a subscriber. A network exposure function (NEF) (not illustrated) is able to access information for management of a terminal in the 5G network so as to subscribe to a mobility management event of the corresponding terminal 120, subscribe to a session management event of the terminal 120, request session-related information, configure charging information of the terminal, and request to change a PDU session policy for the terminal. The NEF 903 may provide information necessary for a service to the 5G network so as to provide a function of storing the information in a UDR. An NG-RAN 905 may refer to the base station 110 that provides a wireless communication function to the terminal 120. A UPF 907 is an abbreviation of user plane function, and may serve as a gateway for transferring a packet transmitted or received by the terminal 120. The UPF 907 may also be connected to a data network connected to the Internet, and data required to be transferred via the Internet, which is in the packet transmitted by the terminal 120, may be routed to the Internet data network.

The UPF 907 may be a PSA UPF 909 serving as an anchor of the PDU session connected to the data network. According to an embodiment, all data transmitted by the terminal 120 to the data network may be transferred via this anchor UPF. A data packet destined for a centralized data network or the Internet data network may be transferred to the PSA UPF 909 of a corresponding PDU session. The PDU session for the PSA UPF 909 may exist independently or may be connected to an uplink classifier (ULCL) LPF or a branching point LPF (in a case of a PDU session supporting IPv6 multi-homing, multiple PSA UPFs may be connected based on the branching point UPF) so as to be connected to a local PSA UPF branched from one PDU session to a local data network. The ULCL UPF or branching point UPF (BP UPF) may determine whether to perform transmission to the local PSA UPF or another PSA UPF, by checking an IP address (target IP address) transmitted by the terminal 120. The ULCL UPF or BP UPF itself may serve as a local PSA UPF. Therefore, a function to transmit a packet to the local data network may be provided. The SMF 130b may insert, replace, and/or remove the ULCL UPF or the BP UPF according to a location of the terminal 120 or a network deployment situation. That is, if it is determined that there is a local data network that the terminal 120 is able to access from a specific location, the SMF 130b which provides a PDU session for data transmission to a cloud or a centralized network, such as an Internet data network, may insert the ULCL UPF or BP UPF so as to provide a data connection to the corresponding local data network. In this case, only a data connection structure in the network may be changed without an influence of the terminal 120. That is, in a state where the terminal 120 is not aware, a packet transmitted by the terminal 120 may be branched to the local data network or to the central data network so as to be transmitted only by an operation of the 5G system. The SMF 130b may provide a function referred to as an SSC mode. This is an abbreviation of session and/or service continuity, and may conform to definition of an SSC mode defined in 3GPP. The SMF 130b may change a PSA in SSC mode 2 or SSC mode 3, and if there is a data network that, the terminal 120 is able to access according to the current location of the terminal 120, the SMF 130b may newly assign a PSA enabling connection to the corresponding data network and may change or newly generate a PDU session so that data is transmitted via the PSA. (A data path may be changed by performing a PDU session modification procedure, or the terminal 120 may be triggered to establish a new PDU session.) Via the described insertion/replacement of the ULCL UPF or BP UPF, or operation according to the SSC mode, the SMF 130b enables the terminal 120 to be connected to the local data network, and accordingly, the terminal 120 may be connected to an application server in the local data network.

A third-party service provider may negotiate with the PCF 130c or the NEF 903 of a 3GPP network. Via this negotiation, QoS information necessary for using a service may be provided to the 5G mobile communication system through the PCF 130c or the NEF 903.

Figure 10:
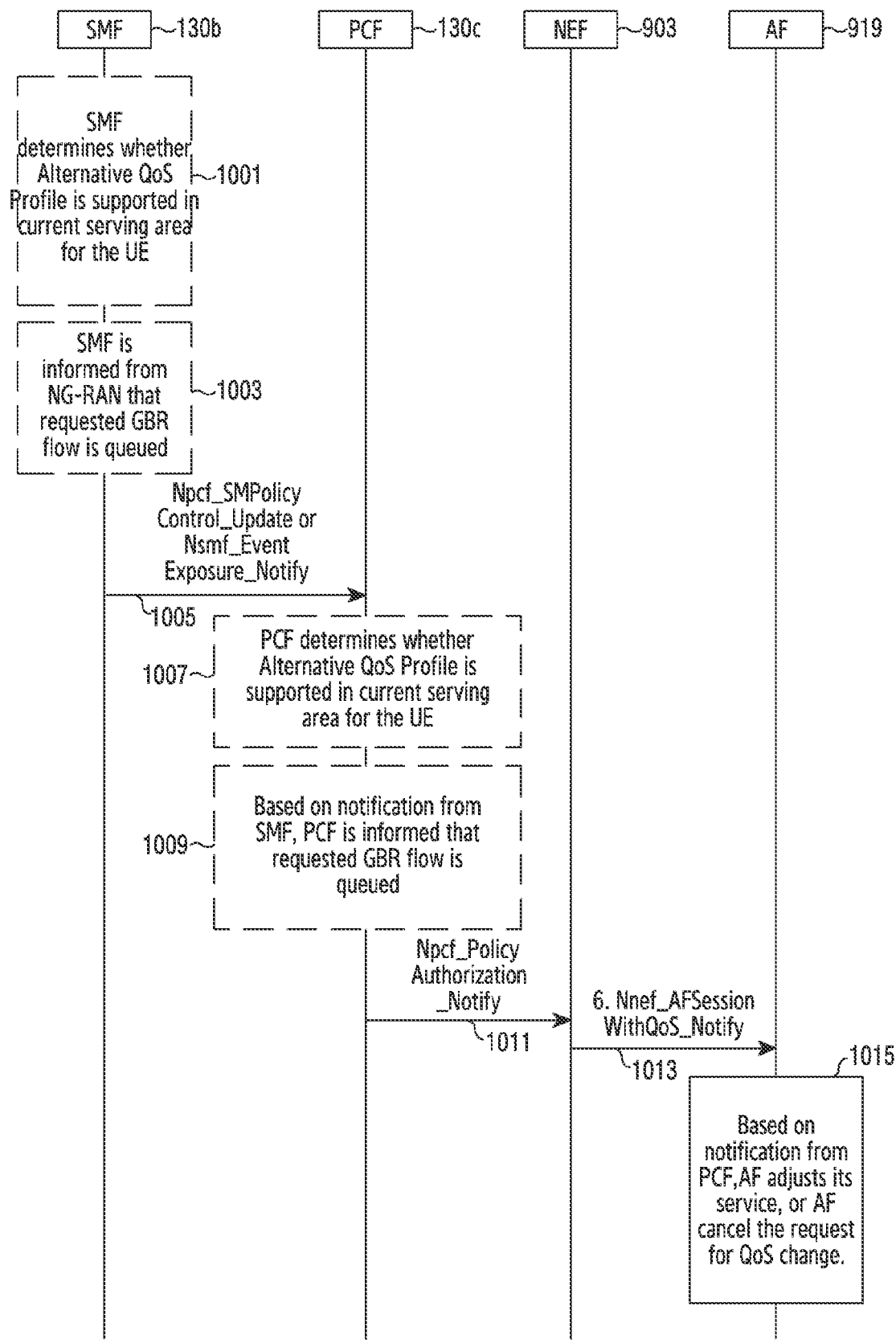
FIG. 10 illustrates a diagram for a signal flow between an SW, a PCF, an NEF, and/or an AF in the wireless communication system according to various embodiments of the disclosure.

FIG. 10 illustrates a diagram for a signal flow between the SMF 130b, the PCF 130c, the NEF 903, and/or an AF 919 in the wireless communication system according to various embodiments of the disclosure.

Referring to FIG. 10, in operation 1001, the SMF 130b determines whether alternative QoS profile handling is supported in a current service area. According to an embodiment, the determination may be according to information pre-configured for the SMF 130*b* via OAM, for example, a specific RAN node, a specific cell ID, or information on whether an alternative QoS profile is supported with respect to a specific tracking area ID.

According to an embodiment, based on an identifier, which indicates whether the base station 110 is able to support an alternative QoS profile, in information received via an N2 SM message from the base station 110, the SMF 130*b* may determine whether alternative QoS profile is supportable.

In operation 1003, even if the SMF 130*b* is unable to generate, with a requested parameter, a GBR flow requested from an NG-RAN, the SMF 130*b* may be requested to maintain the request without deleting or rejecting the request. For example, the SMF 130*b* may request the base station 110 to continuously maintain the GBR QoS flow without rejecting or releasing the GBR QoS flow, via the PDU session establishment procedure or PDU session establishment change procedure.

According to an embodiment, the base station 110 may be requested to queue (wait for or pend) the GBR QoS flow establishment request. The SMF 130*b* may make the request from the base station 110 with an explicit indication or by setting 0 Kbps as one GBR value of the alternative QoS profile for the corresponding GBR QoS flow. The base station 110 may inform the SMF 130*b* that the GBR QoS flow has been queued and cannot be established due to current radio resource congestion. The base station 110 may, for example, transmit, to the SMF 130*b*, an indication explicitly indicating that the GBR QoS flow has been queued and cannot be established, or may notify about the GFBR value of 0 kbps to the SMF 130*b*. The SMF 130*b* having received the indication or notification may be informed that the requested GBR QoS flow is currently stored in the queue (or waiting or pending). The base station 110 may also transfer the reason therefor. For example, reasons, such as network congestion and maintenance of the base station 110, may be transferred together.

In operation 1005, the SMF 130*b* may transmit an SM policy control update message (Npcf_SMPolicyControl_Update) or an event exposure notification message (Nsmf_EventExposure) to the PCF 130*c*. In other words, a result of the determination in operation 1001 may be notified to the PCF 130*c* via an SM policy control update message (Npcf_SMPolicyControl_Update) or event exposure notification message (Nsmf_EventExposure Notify) operation. That is, the SMF 130*b* may transmit a notification that the alternative QoS profile is not supported in an area, in which the terminal 120 is currently located, or by the base station 110 serving the terminal 120, or a notification that establishment of the GBR QoS flow requested to the base station 110 has been stored in the queue (or waiting or pending).

In operation 1007, the PCF 130*c* may determine whether the currently serving RAN supports alternative QoS profile handling. According to an embodiment, the PCF 130*c* may subscribe to an event for a location of the terminal 120 via the SMF 130*b* or the AMF 130*a*, and accordingly, when the location of the terminal 120 changes, the PCF 130*c* may be notified of the location, for example, a RAN node that serves the terminal 120, an ID of a cell in which the terminal 120 is located, and an ID of a tracking area in which the terminal 120 is located. Accordingly, after determination of the location of the terminal 120, the PCF 130*c* may determine whether alternative QoS profile handling is supported at the current location. This may be determined according to information pre-configured for the PCF 130*c* via OAM, for example, a specific RAN node, a specific cell ID, or information on whether an alternative QoS profile is supported with respect to a specific tracking area ID.

In operation 1009, the PCF 130*c* may receive, from the SMF 130*b*, an identifier indicating whether the alternative QoS profile is supportable by the base station 110 serving the current terminal 120 or at the location of the current terminal 120, and may determine, based on the indication, whether the alternative QoS profile is supported at the current location or by the serving base station of the current terminal 120.

According to an embodiment, based on the notification received from the SMF 130*b*, the PCF 130*c* may be informed that the requested GBR flow has been queued. According to an embodiment, the PCF 130*c* may know, via the notification according to operation 1005, that the base station 110 serving the current terminal 120 has queued the GBR QoS flow without establishment of the GBR QoS flow due to current radio resource congestion. For example, the PCF 130*c* may have received, from the SMF 130*b*, an indication explicitly indicating that the GBR QoS flow has been queued and cannot be established, or may receive a notification indicating the GFBR value of 0 kbps from the SMF 130*b*. The PCF 130*c* having received the indication or notification may be informed that the requested GBR QoS flow has been currently stored in the queue (or waiting or pending).

As described above, the PCF 130*c* having determined that "the requested GBR QoS flow" is pending may check when the GBR QoS flow can be established in the corresponding area or by the corresponding serving base station. To this end, the PCF 130*c* may receive information via the OAM system or may receive an expected time to establishment of the GBR QoS flow, via a network data analytics function (NWDAF).

In operation 1011, the PCF 130*c* may transmit, to the AF 919, a message (Npcf_Policcy_Authorization_Notify) informing that an alternative session QoS change function is not currently supported. According to an embodiment, the PCF 130*c* may inform that the alternative session QoS change function (an alternative QoS profile support function according to alternative service requirements, or the request QoS requested by the AF 919—the QoS for establishment of the GBR QoS flow) currently requested by the AF 919 is not currently supported.

According to an embodiment, the PCF 130*c* may inform that the corresponding function is not supported at the current location of the terminal. The PCF 130*c* may also transfer, to the AF 919, the reason why the function is not supported.

According to an embodiment, after receiving, from the SMF 130*b*, information indicating that the requested QoS— the QoS for establishment of the GBR QoS flow-requested by the AF 919 is not currently supported, the PCF 130*c* may inform the AF 919 that the requested. QoS change is not supported.

According to an embodiment, the PCF 130*c* may determine to transfer, to the AF 919, an "expected wait time to establishment of the GBR QoS flow", i.e., an expected wait time, determined in operation 1009.

According to an embodiment, when the PCF 130*c* is unable to directly transmit the notification message configured as described above to the AF 919, the message may be transmitted to the NEF 903, and the NEF 903 having received the message may transfer the same to the AF 919 via operation 1003.

In operation 1015, the AF 919 may modify its own service, based on the request received from the PCF 130*c* or may cancel the request for QoS change. In other words, the AF 919 receives, from the PCF 130*c*, information indicating that the session QoS change function (the alternative QoS profile support function according to alternative service requirements) requested by the AF 919 is not currently supported at the location of the terminal 120.

The AF 919 may, for example, receive, from PCF 130*c*, information indicating that the requested QoS—the QoS for establishment of the GBR QoS flow-requested by the AF 919 is not currently supported. According to an embodiment, the AF 919 may receive the "expected wait time to establishment of the GBR QoS flow", i.e., the expected wait time.

Accordingly, the AF 919 may perform one of the following operations.

The AF 919 may cancel an alternative service requirement operation that the AF 919 itself has previously requested.

The AF 919 may request to change QoS of the corresponding session to a specific QoS value. For example, requirements of the previously requested GBR are determined to be too high, and a lower value of GBR may be thus requested.

The AF 919 may determine not to support an advanced service for the terminal 120, based on the received notification. For example, a V2X autonomous driving service may be stopped, or an autonomous driving level may be lowered to a lower level. Alternatively, an AR/VR service of a high quality may be stopped, or a service quality may be adjusted to transmit a low-resolution image. Alternatively, the AF 919 may determine to continue providing a media service by using a non-GBR flow.

When the AF 919 receives, from the PCF 130*c*, information indicating that the GBR QoS flow has been queued and cannot be established due to current radio resource congestion, and the expected time (the expected wait time) to establishment thereof, the AF 919 may determine, in consideration of the time information, when to provide the high-quality video or AR/VR service to the terminal 120 again or whether or not to provide the high-quality video or AR/VR service to the terminal 120.

Figure 11:
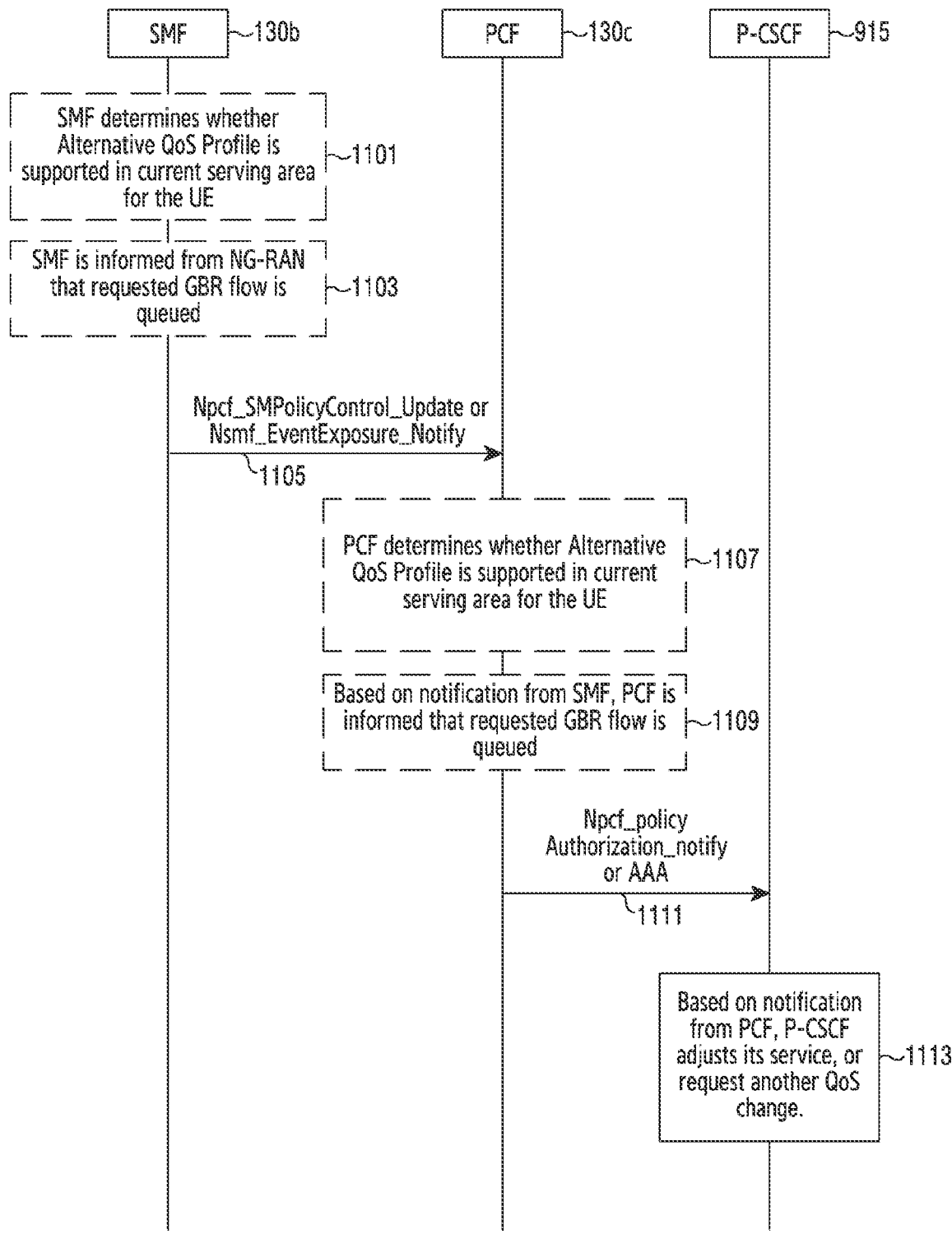
FIG. 11 illustrates a diagram for a signal flow between an SMF, a PCF, and/or a P-CSCF in the wireless communication system according to various embodiments of the disclosure.

FIG. 11 illustrates a diagram of a signal flow between the SMF 130*b*, the PCF 130*c*, and/or a P-CSCF 915 in the wireless communication system according to various embodiments.

Referring to FIG. 11, in operation 1101, the SMF 130*b* determines whether the alternative QoS profile is supported for the terminal 120 in a current service area. According to an embodiment, the SMF 130*b* may determine whether a RAN currently in use supports alternative QoS profile handling. This may be according to information pre-configured for the SMF via OAM, for example, a specific RAN node, a specific cell ID, or information on whether the alternative QoS profile is supported in an area with respect to a specific tracking area ID.

According to an embodiment, based on an identifier, which indicates whether the base station 110 is able to support the alternative QoS profile, in information received via an N2 SM message from the base station 110, the SMF 130*b* may determine whether alternative QoS profile is supportable.

In operation 1103, even if the SMF 130*b* is unable to generate, with a requested parameter, a GBR flow requested from an NG-RAN, the SMF 130*b* may be requested to maintain the request without deleting or rejecting the request. According to an embodiment, the SMF 130*b* may request the base station 110 to continuously maintain the GBR QoS flow without rejecting or releasing the GBR QoS flow, via the PDU session establishment procedure or PDU session change procedure.

According to an embodiment, the SMF 130*b* may request the base station 110 to queue (wait for or pend) the GBR QoS flow establishment request. The SMF 130*b* may make the request from the base station 110 with an explicit indication or by setting 0 Kbps as one GBR value of the alternative QoS profile for the corresponding GBR QoS flow.

Accordingly, the base station 110 may inform the SMF 130*b* that the GBR QoS flow has been queued and cannot be established due to current radio resource congestion. The base station 110 may, for example, transmit, to the SMF 130*b*, an indication explicitly indicating that the GBR QoS flow has been queued and cannot be established, or may notify about the GI BR value of 0 kbps to the SMF 130*b*. The SMF 130*b* having received the indication or notification may be informed that the requested GBR QoS flow is currently stored in the queue (or waiting or pending).

According to an embodiment, the base station 110 may also transfer the reason for queuing without establishing the GBR QoS flow. For example, reasons, such as network congestion and maintenance of the base station 110, may be transferred together.

In operation 1105, the SMF 130*b* may transmit an SM policy control update message (Npcf_SMPolicyControl_Update) or an event exposure notification message (Nsmf_EventExposure_Notify) to the PCF 130*c*.

According to an embodiment, the SMF 130*b* may notify the PCF 130*c* of a result of the determination in operation 1101 via an SM policy control update message (Npcf_SMPolicyControl_Update) or event exposure notification message (Nsmf_EventExposure Notify) operation. That is, the SMF 130*b* may transmit a notification that the alternative QoS profile is not supported in an area, in which the terminal 120 is currently located, or by the base station 110 serving the terminal 120, or a notification that establishment of the GBR QoS flow requested to the base station 110 has been stored in the queue (or waiting or pending).

In operation 1107, the PCF 130*c* may determine whether the current service area supports alternative QoS profile handling. According to an embodiment, the PCF 130*c* may subscribe to an event for a location of the terminal 120 via the SMF 130*b* or the AMF 130*a*, and accordingly, when the location of the terminal 120 changes, the PCF 130*c* may be notified of the location, for example, a RAN node that serves the terminal 120, an ID of a cell in which the terminal 120 is located, and an ID of a tracking area in which the terminal 120 is located. Accordingly, after determination of the location of the terminal 120, the PCF 130*c* may determine whether alternative QoS profile handling is supported at the current location. This may be determined according to information pre-configured for the PCF 130*c* via. OAM, for example, a specific RAN node, a specific cell ID, or information on whether an alternative QoS profile is supported with respect to a specific tracking area ID.

In operation 1107, the PCF 130*c* may determine whether the alternative QoS profile is supported at the current location or by the serving base station for the terminal 120. According to an embodiment, the PCF 130*c* may receive, from the SMF 130*b*, an identifier indicating whether the alternative QoS profile is supportable by the base station 110 serving the current terminal 120 or at the location of the current terminal 120, and may determine, based on the indication, whether the alternative QoS profile is supported at the current location or by the serving base station of the current terminal 120.

Based on the notification received from the SW 130*b*, the PCF 130*c* may be informed in operation 1109 that the requested GBR flow has been queued. According to an embodiment, the PCF 130*c* may be informed, via the notification according to operation 1105, that the base station 110 serving the current terminal 120 has queued the GBR QoS flow and cannot establish the GBR QoS flow due to current radio resource congestion. For example, the PCF 130*c* may have received, from the SMF 130*b*, an indication explicitly indicating that the GBR QoS flow has been queued and cannot be established, or may receive a notification about the GFBR value of 0 kbps to the SMF. The PCF 130*c* having received the indication or notification may be informed that the requested GBR QoS flow has been currently stored in the queue (or waiting or pending).

As described above, the PCF 130*c* having determined that "the requested GBR QoS flow" is pending may check when the GBR QoS flow can be established in the corresponding area or by the corresponding serving base station. To this end, the PCF 130*c* may receive information via the OAM system or may receive an expected time to establishment of the GBR QoS flow, via the NWDAF.

In operation 1111, the PCF 130*c* may transmit, to the P-CSCF 915, an AA-Answer (AAA, when the PCF 130*c* and the P-CSCF 915 are linked with Rx) message or a policy authority notification message (Npcf_Policy_Authorization-Notify) (when the PCF 130*c* and the P-CSCF 915 are linked with Npcf).

According to an embodiment, the PCF 130*c* may inform that the alternative session QoS change function (the alternative QoS profile support function according to alternative service requirements, or the request QoS requested by the IMS server—the QoS for establishment of the GBR QoS flow) requested by the current IMS server (the P-CSCF 915 or IMS-ALG/IMS-AGW) is not currently supported.

According to an embodiment, the PCF 130*c* may inform that the corresponding function is not supported at the current location of the terminal. The PCF 130*c* may also transfer, to the IMS server, the reason why the function is not supported.

According to an embodiment, after receiving, from the SMF 130*b*, information indicating that the requested QoS—the QoS for establishment of the GBR QoS flow-requested by the IMS server is not currently supported, the PCF 130*c* may inform the IMS server that the requested QoS change is not supported. This may be transferred by configuration of the GRB value of the GBR flow to 0.

According to an embodiment, the PCF 130*c* may determine to transfer, to the IMS server, an "expected wait time to establishment of the GBR QoS flow", i.e., an expected wait time, determined in operation 1109. In this case, the IMS server may transfer the information received from the PCF 130*c* to another IMS server (e.g., an S-CSCF), in which case, a session initiation protocol (SIP) may be used.

In operation 1113, based on the notification received from the PCF 130*c*, the P-CSCF 915 may modify its own service or request another QoS change.

According to an embodiment, the IMS server may receive, from the PCF 130*c*, information indication that the session QoS change function (the alternative QoS profile support function according to alternative service requirements) that the IMS server itself has requested is not supported at the current location of the terminal 120.

According to an embodiment, the IMS server may receive, from the PCF 130*c*, information indicating that the requested QoS—the QoS for establishment of the GBR QoS flow—requested by the IMS server is not currently supported. In this case, the IMS server may also receive the "expected wait time to establishment of the GBR QoS flow", i.e., the expected wait time.

Accordingly, the IMS server may perform one of the following operations, which may cause signaling exchange between the IMS server, a service application server (e.g., a telephony application server (TAS)) or a subscription information database (HSS or UDM), and the terminal 120.

The IMS server may cancel an alternative service requirement operation that the IMS server itself has previously requested.

The IMS server may request to change QoS of the corresponding session to a specific QoS value. For example, requirements of the previously requested GBR are determined to be too high, and a lower value of GBR may be thus requested.

The IMS server may determine not to support an advanced service for the terminal 120, based on the received notification. For example, a V2X autonomous driving service may be stopped, or an autonomous driving level may be lowered to a lower level. Alternatively, an AR/VR service of a high quality may be stopped, or a service quality may be adjusted to transmit a low-resolution image. Alternatively, the P-CSCF 915 may determine to continue providing a media service by using a non-GBR flow.

When the IMS server receives, from the PCF 130*c*, information indicating that the GBR QoS flow has been queued and cannot be established due to current radio resource congestion, and the expected time (the expected wait time) to establishment thereof, the IMS server may determine, in consideration of the time information, when to provide the high-quality video or AR/VR service to the terminal 120 again or whether or not to provide the high-quality video or AR/VR service to the terminal 120.

The IMS server (or a linked service application server) may temporarily transmit media (or data), which is to be transmitted in the GBR QoS flow, via a non-GBR QoS flow instead. To this end, the IMS server may temporarily change an IP address or port number to which the media (or data) is to be transmitted, and may switch a codec, a compression rate, a transmission rate, or a transmission/media layer protocol of the media (or data) so as to be appropriate for characteristics of the non-GBR QoS flow. This operation may be switched back to the GBR QoS flow to perform media (or data) transmission/reception if the transmission of the GBR QoS flow becomes possible, that is, when signaling indicating that the GBR QoS flow has been established is explicitly received or the GBR value of the GBR QoS flow is updated to a requested value.

Figure 12:
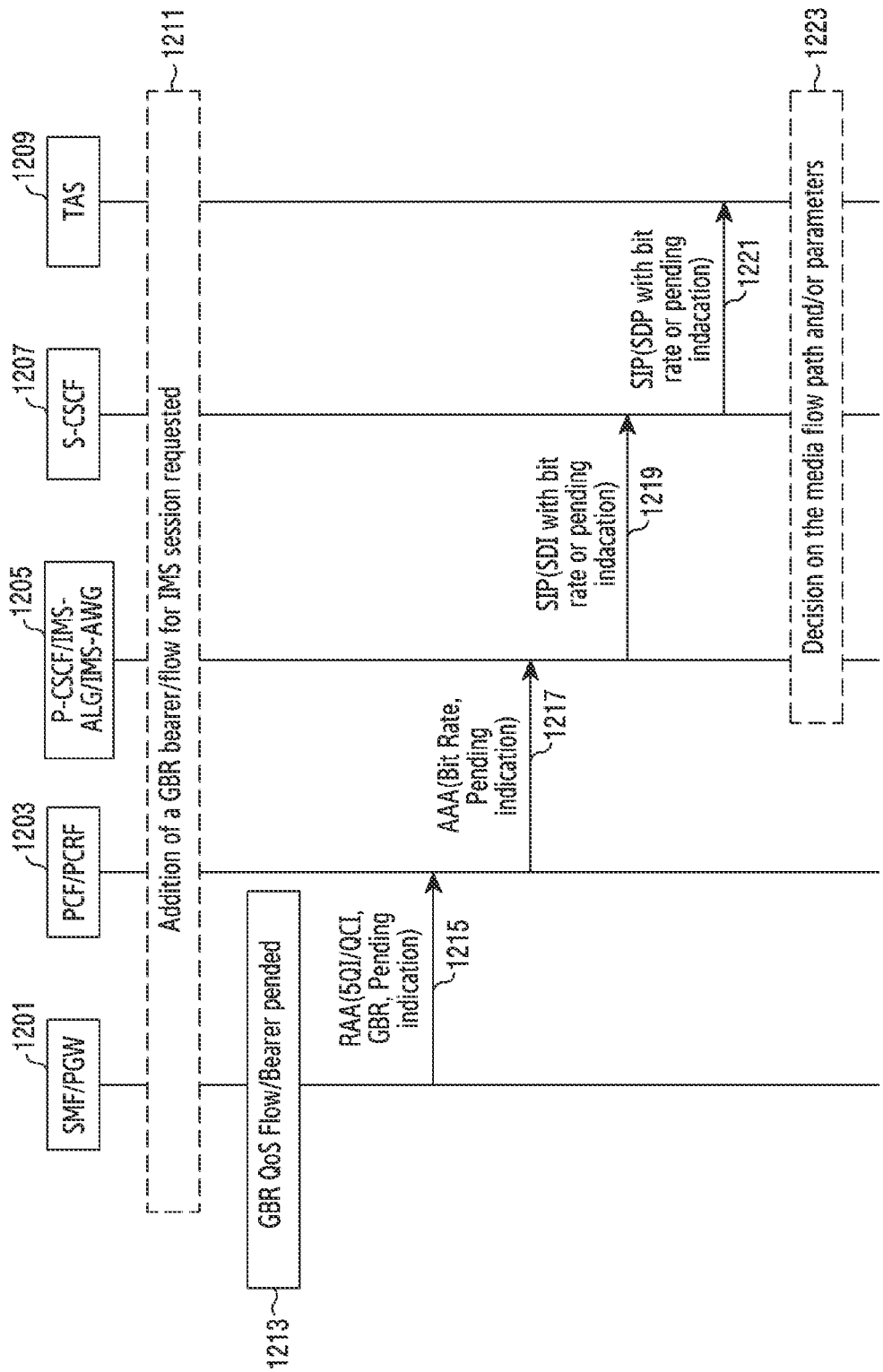
FIG. 12 illustrates a diagram for a signal flow between an SMF/PGW, a PCF/PCRF, a P-CSCF/IMS-ALG/IMS-AWG, an S-CSCF, and/or a TAS in the wireless communication system according to various embodiments of the disclosure.

FIG. 12 illustrates a diagram for a signal flow between an SMF/PGW, a PCF/PCRF, a P-CSCF/IMS-ALG/IMS-AWG, an S-CSCF, and/or a TAS in the wireless communication system according to various embodiments of the disclosure.

Referring to FIG. 12, in operation 1213, a GBR bearer/flow for a requested IMS session may be added. According to an embodiment, GBR flow (or a GBR bearer, hereinafter, denoted as flow only) generation may have been requested via signaling between an SMF (or PGW, hereinafter, denoted as SMF only) 1201, a PCF (or PCRF, hereinafter, denoted as PCF only) 1203, an IMS server (P-CSCF and linked servers) 1205, and a service application server (TAS 1209 etc.).

According to an embodiment, during this procedure, the PCF 1203 may have received a re-auth-request (RAR) message from the P-CSCF 1205, and the P-CSCF 1205 may have received an authenticate-authorize-request (AAR) message from the S-CSCF 1207.

In operation 1213, the SMF 1201 may request the base station 110 to establish the GBR QoS flow via a PDU session (or bearer) establishment procedure or a PDU session change procedure. If it is difficult to support the GBR QoS flow with the requested parameter, the base station 110 may be requested to maintain the GBR QoS flow request without rejecting or releasing the request.

According to an embodiment, the SMF 1201 may request the base station 110 to queue (wait for or pend) the GBR QoS flow establishment request. For example, the SMF 1201 may make the request from the base station 110 with an explicit indication or by setting 0 Kbps as one GBR value of the alternative QoS profile for the corresponding GBR QoS flow. Accordingly, the base station 110 may inform the SMF 1201 that the GBR QoS flow has been queued and cannot be established due to current radio resource congestion. For example, the base station may transmit, to the SMF 1201, an indication explicitly indicating that the GBR QoS flow has been queued and cannot be established, or may notify about the GFBR value of 0 kbps to the SMF 1201. The SMF 1201 having received the indication or notification may be informed that the requested GBR QoS flow has been currently stored in the queue (or waiting or pending).

According to an embodiment, the base station 110 may also transfer the reason why the requested GBR QoS flow is currently stored in the queue (or waiting or pending). For example, reasons, such as network congestion and maintenance of the base station 110, may be transferred together.

In operation 1215, the SMF/PGW 1201 may transmit a re-auth-answer (RAA) message to the PCF/PCRF 1203. The SMF 1201 may, for example, notify the PCF 1203 of a result of processing the GBR flow generation. The SMF 1201 may transmit a notification that the alternative QoS profile is not supported in the area, in which the current terminal 120 is located, or by the base station 110 serving the terminal 120, or a response that establishment of the GBR QoS flow requested to the base station 110 is stored in the queue (or waiting or pending) or that the GBR value of the requested GBR flow has been configured to 0, and the notification or the response may include a QoS parameter configuration (e.g., one or more of requested 5QI/QCI, the configured GBR value, and an indication that establishment of the GBR bearer is queued/pending) of the RAA message.

In operation 1217, the PCF/PCRF 1203 may transmit an authenticate-authorize-answer (AAA) message to the P-CSCF/IMS-ALG/IMS-AWG 1205. The PCF 1203 may, for example, inform the IMS server (P-CSCF, IMS-AWG, IMS-ALG) 1205 of a result of processing the request for media (or data) transmission. This is transmitted via the AAA message and may include one or more of a bit rate of a resource for the requested transmission, which is configured to 0, a codec profile number referring to this configuration, and an indication that requested resource reservation/establishment has been queued/pending.

In operation 1219, the P-CSCF/IMS-ALG/IMS-AWG 1205 may transmit a session initiation protocol (SIP) message to the S-CSCF 1207. According to an embodiment, the IMS server (P-CSCF, IMS-AWG, IMS-ALG) 1205 may notify the S-CSCF 1207 of the result of processing the request for media (or data) transmission. This is transferred using a session description protocol (SDP) in the message of the session initiation protocol (SIP), and may include one or more of the bit rate of the resource for the requested transmission, which is configured to 0, the codec profile number referring to this configuration, and the indication that requested resource reservation/establishment has been queued/pending.

In operation 1221, the S-CSCF 1207 may transmit the SIP message to the TAS 1209. For example, the S-CSCF 1205 may notify about the result of processing the request for media (or data) transmission, to the service application server (the TAS in a case of a voice service). This is transferred using the session description protocol (SDP) in the message of the session initiation protocol (SIP), and may include one or more of the bit rate of the resource for the requested transmission, which is configured to 0, the codec profile number referring to this configuration, and the indication that requested resource reservation/establishment has been queued/pending.

Determinations may be made regarding media flow paths and/or parameters in operation 1223. Via operation 1223, determinations that the GBR QoS flow cannot be established and has been queued, the establishment/reservation of the resource for the requested media (or data transmission) has been stored in the queue (or waiting or pending), and/or the expected wait time to additionally requested resource establishment.

According to an embodiment, the IMS server or service application servers that have received the expected wait time may perform the following operation. This may cause signaling exchange between the IMS server, the service application server (e.g., the telephony application server (TAS)) or a subscription information database (HSS or UDM), and the terminal 120.

The IMS server (P-CSCF, IMS-AGW, IMS-ALG, S-CSCF or service application server, hereinafter, referred to as IMS server only) may cancel an alternative service requirement operation that the IMS server itself has previously requested.

The IMS server may request to change QoS of the corresponding session to a specific QoS value. For example, requirements of the previously requested GBR are determined to be too high, and a lower value of GBR may be thus requested.

The IMS server may determine not to support an advanced service for the terminal 120, based on the received notification. For example, a V2X autonomous driving service may be stopped, or an autonomous driving level may be lowered to a lower level. Alternatively, an AR/VR service of a high quality may be stopped, or a service quality may be adjusted to transmit a low-resolution image. Alternatively, the P-CSCF may determine to continue providing a media service by using a non-GBR flow.

When the IMS server receives, from the PCF, information indicating that the GBR QoS flow has been queued and cannot be established due to current radio resource congestion, and the expected time (the expected wait time) to establishment thereof, the IMS server may determine, in consideration of the time information, when to provide the high-quality video or AR/VR service to the terminal 120 again or whether or not to provide the high-quality video or AR/VR service to the terminal 120.

The IMS server (or the linked service application server) may temporarily transmit media (or data), which is to be transmitted in the GBR QoS flow, via a non-GBR QoS flow instead. To this end, the IMS server may temporarily change an IP address or port number to which the media (or data) is to be transmitted, and may switch a codec, a compression rate, a transmission rate, or a transmission/media layer protocol of the media (or data) so as to be appropriate for characteristics of the non-GBR QoS flow. This operation may be switched back to the GBR QoS flow to perform media (or data) transmission/reception if the transmission of the GBR QoS flow becomes possible, that is, when signaling indicating that the GBR QoS flow has been established is explicitly received or the GBR value of the GBR QoS flow is updated to a requested value.

According to various embodiments of the disclosure, an operation method of a base station in a wireless communication system may include transmitting a first message to another base station, and receiving a second message from the another base station, wherein the first message includes information indicating whether the base station supports at least one of an alternative quality of service (QoS) profile function and a QoS flow establishment pending function.

According to an embodiment, the second message may include information indicating whether the another base station supports at least one of the alternative QoS profile function and the QoS flow establishment pending function.

According to an embodiment, the method may further include processing a handover of a terminal, based on whether at least one of the alternative QoS profile function and the QoS flow establishment pending function is supported.

According to an embodiment, when a guaranteed bit rate (GBR) QoS flow is required for a PDU session used by the terminal, the method may further include transmitting information on a QoS level supportable to the terminal.

According to an embodiment, the information on the QoS level may include at least one of a guaranteed flow bit rate (GFBR), a packet error rate (PER), or a packet delay budget (PDB).

According to various embodiments of the disclosure, a base station may include: a communication unit; and a controller operatively connected to the communication unit, wherein the controller is configured to transmit a first message to another base station, and receive a second message from the another base station, wherein the first message includes information indicating whether the base station supports at least one of an alternative quality of service (QoS) profile function and the QoS flow establishment pending function.

According to an embodiment, the second message may include information indicating whether the another base station supports at least one of the alternative QoS profile function and the QoS flow establishment pending function.

According to an embodiment, the controller may process a handover of a terminal, based on whether at least one of the alternative QoS profile function and the QoS flow establishment pending function is supported.

According to an embodiment, the controller may be configured to, when a guaranteed bit rate (GBR) QoS flow is required for a PDU session used by the terminal, transmit information on a QoS level supportable to the terminal.

According to an embodiment, the information on the QoS level may include at least one of a guaranteed flow bit rate (GFBR), a packet error rate (PER), or a packet delay budget (PDB).

According to various embodiments of the disclosure, an operation method of an analytics function (AF) in a wireless communication system may include receiving a first message, and modifying a service or canceling a request for a quality of service (QoS) change, based on the first message, wherein the first message includes information indicating that an alternative session QoS change function is not supported.

According to an embodiment, the method may further include requesting to change a QoS of a current session to a specific QoS value, based on the first message.

According to an embodiment, the method may further include receiving information on an expected wait time to establishment of a guaranteed bit rate (GBR) QoS flow.

According to an embodiment, the method may further include determining a service quality, based on information on the expected wait time to establishment of the GBR QoS flow.

According to an embodiment, the first message and the information on the expected wait time may be received from a policy and charging function (PCF) or a network exposure function (NEF).

According to various embodiments of the disclosure, an analytics function (AF) in a wireless communication system may include: a communication unit; and a controller operatively connected to the communication unit, wherein the controller is configured to receive a first message, and modify a service or cancel a request for a quality of service (QoS) change, based on the first message, wherein the first message includes information indicating that an alternative session QoS change function is not supported.

According to an embodiment, the controller may be further configured to request to change a QoS of a current session to a specific QoS value, based on the first message.

According to an embodiment, the controller may be further configured to receive information on an expected wait time to establishment of a guaranteed bit rate (GBR) QoS flow.

According to an embodiment, the controller may be further configured to determine a service quality, based on information on the expected wait time to establishment of the GBR QoS flow.

According to an embodiment, the controller may be configured to receive the first message and the information on the expected wait time from a policy and charging function (PCF) or a network exposure function (NEF).

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first base station which supports an alternative quality of service (QoS) profile function and a QoS flow establishment pending function in a wireless communication system, the method comprising:
   receiving, from a terminal, a message including a QoS flow establishment request and a QoS profile list request;
   storing the QoS flow establishment request and the QoS profile list request, in case that the first base station is in a congested situation;
   selecting a highest QoS profile among one or more alternative QoS profiles included in the QoS profile list request;
   transmitting a first message to a second base station; and
   receiving a second message in response to the first message from the second base station,
   wherein the first message includes:
      an indication that the QoS flow establishment request of the terminal is in a pending state and the selected highest QoS profile.

2. The method of claim 1, wherein the first message further includes time information on a stored QoS profile, the QoS profile being related to the QoS flow establishment request,
   wherein the time information includes a timestamp indicating a time at which the QoS flow establishment request of the terminal first entered the queue and an elapsed time from a time the QoS flow establishment request of the terminal entered the queue to present.

3. The method of claim 1, further comprising processing a handover of the terminal, based on the second message.

4. The method of claim 1, further comprising, when a guaranteed bit rate (GBR) QoS flow is required for a protocol data unit (PDU) session used by the terminal, transmitting information on a QoS level supportable to the terminal.

5. The method of claim 4, wherein the information on the QoS level supportable includes at least one of a guaranteed flow bit rate (GFBR), a packet error rate (PER), or a packet delay budget (PDB).

6. A first base station which supports an alternative QoS profile function and a quality of service (QoS) flow establishment pending function in a wireless communication system, the first base station comprising:
   a communication unit; and
   a controller operatively connected to the communication unit,
   wherein the controller is configured to:
      receive, from a terminal, a message including a QoS flow establishment request and a QoS profile list request,
      in case that the first base station supports an alternative QoS profile function and a QoS flow establishment pending function:
      store the QoS flow establishment request and the QoS profile list request, in case that the first base station is in a congested situation,
      select a highest QoS profile among one or more alternative QoS profiles included in the QoS profile list request,
      transmit a first message to a second base station, and
      receive a second message in response to the first message from the second base station,
   wherein the first message includes:
      an indication that the QoS flow establishment request of the terminal is in a pending state, and the selected highest QoS profile.

7. The first base station of claim 6, wherein the first message further includes time information on a QoS profile stored in a queue, the QoS profile being related to the QoS flow establishment request,
   wherein the time information includes a timestamp indicating a time at which the QoS flow establishment request of the terminal first entered the queue and an elapsed time from a time the QoS flow establishment request of the terminal entered the queue to present.

8. The first base station of claim 6, wherein the controller is further configured to process a handover of the terminal, based on the second message.

9. The first base station of claim 6, wherein the controller is further configured to, when a guaranteed bit rate (GBR) QoS flow is required for a protocol data unit (PDU) session used by the terminal, transmit information on a QoS level supportable to the terminal.

10. The first base station of claim 9, wherein the information on the QoS level supportable includes at least one of a guaranteed flow bit rate (GFBR), a packet error rate (PER), or a packet delay budget (PDB).

11. The method of claim 1, wherein the second message includes information indicating whether the second base station supports at least one of the alternative QoS profile function or the QoS flow establishment pending function.

12. The first base station of claim 6, wherein the second message includes information indicating whether the second base station supports at least one of the alternative QoS profile function or the QoS flow establishment pending function.

* * * * *